(12) United States Patent
Cheng et al.

(10) Patent No.: US 6,469,112 B2
(45) Date of Patent: Oct. 22, 2002

(54) (CYCLOALKYL)METHYL SILANES AS EXTERNAL DONORS FOR POLYOLEFIN CATALYSTS

(75) Inventors: Chung-Ping Cheng, League City, TX (US); Michael D. Spencer, Houston, TX (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/930,520

(22) Filed: Aug. 15, 2001

(65) Prior Publication Data

US 2002/0028893 A1 Mar. 7, 2002

Related U.S. Application Data

(60) Provisional application No. 60/227,001, filed on Aug. 22, 2000.

(51) Int. Cl.[7] .................................................. C08F 4/58
(52) U.S. Cl. ............................... 526/124.3; 526/124.6; 526/124.2; 526/158; 526/348; 502/103; 502/104; 502/116; 502/158
(58) Field of Search ..................... 526/124.3, 124.6, 526/124.2, 158, 348; 502/103, 104, 116, 158

(56) References Cited

U.S. PATENT DOCUMENTS

| | | | |
|---|---|---|---|
| 4,771,023 A | 9/1988 | Sasaki et al. | 502/116 |
| 4,784,983 A * | 11/1988 | Mao et al. | 502/111 |
| 4,816,433 A | 3/1989 | Terano et al. | 502/127 |
| 4,829,038 A | 5/1989 | Hoppin et al. | 502/125 |
| 4,927,797 A | 5/1990 | Ewen | 502/127 |
| 5,177,043 A | 1/1993 | Koyama et al. | 502/125 |
| 5,194,531 A | 3/1993 | Toda et al. | 526/125 |
| 5,244,989 A | 9/1993 | Hara et al. | 526/502 |
| 5,438,110 A * | 8/1995 | Ishimaru et al. | 526/125 |
| 5,489,634 A | 2/1996 | Hara et al. | 526/502 |
| 5,576,259 A | 11/1996 | Hasegawa et al. | 502/526 |
| 5,684,173 A | 11/1997 | Hosake et al. | 556/482 |
| 5,773,537 A | 6/1998 | Mueller et al. | 526/125.3 |
| 5,817,590 A | 10/1998 | Hasegawa et al. | 502/526 |

FOREIGN PATENT DOCUMENTS

| | | | | |
|---|---|---|---|---|
| EP | 0642537 B1 | 10/1993 | ........... | C08F/4/646 |
| EP | 0860452 A1 | 8/1998 | ........... | C08F/10/00 |
| JP | 5494590 | 7/1979 | ........... | C08F/10/00 |
| JP | 114813 | 4/2001 | ........... | C08F/4/654 |
| JP | 114814 | 4/2001 | ........... | C08F/4/654 |
| JP | 114815 | 4/2001 | ........... | C08F/4/654 |

* cited by examiner

*Primary Examiner*—David W. Wu
*Assistant Examiner*—Ling-Siu Choi
(74) *Attorney, Agent, or Firm*—Raymond F. Keller

(57) ABSTRACT

One aspect of the present invention relates to a catalyst system for use in olefinic polymerization, containing a solid titanium catalyst component; an organoaluminum compound having at least one aluminum-carbon bond; and an organosilicon compound comprising a (cycloalkyl)methyl group. Another aspect of the present invention relates to a method of making a catalyst for use in olefinic polymerization, involving the steps of reacting a Grignard reagent having a (cycloalkyl)methyl group with an orthosilicate to provide an organosilicon compound having a (cycloalkyl)methyl moiety; and combining the organosilicon compound with an organoaluminum compound having at least one aluminum-carbon bond and a solid titanium catalyst component to form the catalyst.

25 Claims, No Drawings

(CYCLOALKYL)METHYL SILANES AS EXTERNAL DONORS FOR POLYOLEFIN CATALYSTS

This application claims the benefit of No. 60/227,001, filed Aug. 22, 2000.

FIELD OF THE INVENTION

The present invention generally relates to olefin polymerization catalyst systems. In particular, the present invention relates to catalyst systems for making olefin polymers and copolymers and methods of making the catalyst systems and alpha-olefin polymers and copolymers.

BACKGROUND OF THE INVENTION

Polyolefins are a class of polymers derived from simple olefins and include polypropylene and polybutene. Known methods of making polyolefins involve the use of Ziegler-Natta polymerization catalysts. These catalysts polymerize vinyl monomers using a transition metal halide to provide a stereoregulated polymer.

Numerous Ziegler-Natta polymerization catalysts exist. The catalysts have different characteristics and/or lead to the production of polyolefins having diverse properties. For example, certain catalysts have high activity while other catalysts have low activity, and similarly certain catalysts have a long life while other catalysts have a short life. Moreover, polyolefins made with the use of Ziegler-Natta polymerization catalysts vary in stereoregularity, molecular weight distribution, impact strength, melt-flowability, rigidity, heat sealability, isotacticity, and the like.

In the polymerization of alpha-olefins having 3 or more carbon atoms in particular, an electron donor is incorporated into the Ziegler-Natta polymerization catalyst to promote increased stereospecificity. However, using an electron donor to promote increased stereospecificity of poly-alpha-olefins in a Ziegler-Natta polymerization scheme tends to cause large losses in catalyst activity. While lower levels of many characteristics associated with Ziegler-Natta polymerization catalysts can be tolerated, it is difficult to accommodate compromises in catalyst activity. As a result, there is an unmet need for Ziegler-Natta polymerization catalysts (and methods associated therewith) that possess high catalyst activity in addition to other desirable features.

U.S. Pat. Nos. 4,784,983 and 4,861,847 relate to a catalyst system for use in olefinic polymerization and copolymerization is comprised of the following components: (A) a solid product consisting essentially of titanium, magnesium, halogen, polycarboxylic acid esters and organic phosphorus compounds, (B) an organic aluminum compound, and (C) an organic silicon compound.

U.S. Pat. No. 4,829,038 relates to an olefin polymerization catalyst system comprising a solid, hydrocarbon-insoluble, magnesium-containing, titanium-containing, electron donor-containing component; an alkyl aluminum compound; and organosilane compound selected from the group consisting of diisobutyidimethoxysilane, diisopropyidimethoxysilane, t-butyltrimethoxysilane and di-t-butyidimethoxysilane, and mixtures thereof.

U.S. Pat. Nos. 4,990,479 and 5,438,110 relate to an olefin polymerization catalyst formed from (A) a solid titanium catalyst component containing magnesium, titanium and halogen as essential ingredients, (B) an organoaluminum compound, and (C) an organosilicon compound containing a cyclopentyl group, a cyclopentenyl group, a cyclopentadienyl group or a derivative derived from any of these groups.

U.S. Pat. No. 5,244,989 relates to a method for producing a stereospecific polyolefin in the presence of a catalyst comprising a transition metal compound and an organometallic compound, wherein a catalyst system is used which comprises: (A) a solid catalyst component prepared by reacting (i) a homogeneous solution prepared by reacting (i-1) magnesium and a hydroxylated organic compound, (i-2) an oxygen-containing organic compound of titanium and/or (i-3) an oxygen-containing organic compound of silicon, with an oxygen-containing organic compound of aluminum and/or a boron compound, with (ii) at least one aluminum halide compound to obtain a solid product, reacting to this solid product (iii) an electron-donative compound and (iv) a titanium halide compound to obtain a solid component, and further reacting to this solid component (v) silicon tetrachloride and/or an alkyl-substituted product of silicon tetrachloride, (B) at least one member selected from the group consisting of organometallic compounds of Groups IA, IIA, IIB, IIIB and IVB of the Periodic Table, and (C) an electron-donative compound.

U.S. Pat. No. 5,773,537 relates to catalyst systems of the Ziegler-Nafta type containing, as active components a) a titanium-containing solid component in whose preparation a titanium compound, a compound of magnesium, a halogenating agent and an electron donor component are used, b) an aluminum compound and c) as a further electron donor component, an organosilicon compound of the formula $R^1R^2Si(OR^3)_2$ where $R^1$ is $C_1$–$C_{10}$-alkyl or $C_3$–$C_8$-cycloalkyl, excluding sec-butyl, $R^2$ is sec-butyl and $R^3$ is $C_1$–$C_8$-alkyl.

SUMMARY OF THE INVENTION

The present invention provides alpha-olefin polymerization catalyst systems, methods of making the alpha-olefin polymerization catalyst systems, and methods of polymerizing (and copolymerizing) alpha-olefins involving the use of (cycloalkyl)methyl moiety containing external electron donors. The (cycloalkyl)methyl moiety containing external electron donors of the alpha-olefin polymerization catalyst systems contribute to the production of high xylene soluble poly-alpha-olefins while simultaneously maintaining high catalytic efficiency of the catalysts. The use of (cycloalkyl) methyl moiety containing external electron donors permits the tolerance of a large margin of error in the amount of external electron donor employed without effecting the properties of the catalyst system or resulting polymer.

One aspect of the invention relates to a catalyst system for use in olefinic polymerization, containing a solid titanium catalyst component; an organoaluminum compound having at least one aluminum-carbon bond; and an organosilicon compound comprising a (cycloalkyl)methyl group.

Another aspect of the invention relates to a catalyst system for use in olefinic polymerization, containing a solid titanium catalyst component prepared by contacting a titanium compound and a magnesium compound, the solid titanium catalyst component comprising from about 0.01 to about 500 moles of the titanium compound per mole of the magnesium compound; an organoaluminum compound having at least one aluminum-carbon bond, wherein the catalyst system has a mole ratio of aluminum to titanium from about 5 to about 1,000; and an organosilicon compound comprising a (cycloalkyl)methyl group, wherein the catalyst system has a mole ratio of the organoaluminum compound to the organosilicon compound from about 2 to about 90.

Yet another aspect of the invention relates to a method of making a catalyst for use in olefinic polymerization, involving the steps of reacting a Grignard reagent having a (cycloalkyl)methyl group with an orthosilicate to provide an organosilicon compound having a (cycloalkyl)methyl moiety; and combining the organosilicon compound with an organoaluminum compound having at least one aluminum-carbon bond and a solid titanium catalyst component to form the catalyst.

Still yet another aspect of the invention relates to a polymerization process, involving polymerizing or copolymerizing an alpha-olefin in the presence of a catalyst system containing a solid titanium catalyst component; an organoaluminum compound having at least one aluminum-carbon bond; and an organosilicon compound comprising a (cycloalkyl)methyl group.

DETAILED DESCRIPTION OF THE INVENTION

The present invention relates to catalyst systems and methods of making poly-alpha-olefins, such as polypropylene, using catalyst systems containing an organosilicon compound containing a (cycloalkyl)methyl group, and in particular, an organosilicon compound containing a (cycloheptyl)methyl group, a (cyclohexyl)methyl group, a (cyclopentyl)methyl group(cyclobutyl)methyl group and/or a (cyclopropyl)methyl group. The cycloalkyl groups may be substituted (such as lower alkyl substituted (cycloalkyl) methyl) or unsubstituted. Lower alkyl groups have about 4 carbons or less. Poly-alpha-olefins include homopolymers and copolymers made from alpha-olefins.

Generally speaking, the present invention relates to an olefin polymerization catalyst system formed from (A) a solid titanium catalyst component containing magnesium, titanium, halogen, and optionally an organic phosphorus compound and/or a polycarboxylic acid ester; (B) an organoaluminum compound; and (C) an organosilicon compound containing at least one (cycloalkyl)methyl group, or a derivative derived from any of these groups; and a polymerization process which comprises polymerizing or copolymerizing olefins in the presence of the polymerization catalyst system described above.

The solid titanium catalyst component (A) used in this invention is a highly active catalyst component comprising at least magnesium, titanium and halogen. In one embodiment, a solid titanium catalyst component containing magnesium, titanium, halogen and an internal electron donor is employed because activity is sometimes increased and it gives a polymer having high stereoregularity.

The solid titanium catalyst component (A) may be prepared by contacting a magnesium compound and a titanium compound. The titanium compound used in the preparation of the solid titanium catalyst component (A) in the present invention is, for example, a tetravalent titanium compound represented by Formula (I)

$$Ti(OR)_g X_{4-g} \tag{I}$$

wherein R represents a hydrocarbon group, preferably an alkyl group having 1 to about 4 carbon atoms, X represents a halogen atom, and $0 \leq g \leq 4$. Specific examples of the titanium compound include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\ n\text{-}C_4H_9)C_3$, $Ti(OC_2H_5)Br_3$ and $Ti(O\ iso\text{-}C_4H_9)Br_3$; dialkoxytitanium dihalides s as $Ti(OCH_3)_2Cl_2$, $Ti(OC_2H_5)_2Cl_2$, $Ti(O\ n\text{—}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitaniums such as $Ti(OCH_3)_4$, $Ti(OC_2H_5)_4$ and $Ti(O\ n\text{-}C_4H_9)_4$.

Among these, the halogen-containing titanium compounds, especially titanium tetrahalides, are preferred. These titanium compounds may be used individually or in a combination of two or more. They may be used as dilutions in hydrocarbon compounds or halogenated hydrocarbons.

The magnesium compounds used in the preparation of the solid titanium catalyst component are, for example, a magnesium compound having reducibility and a magnesium having no reducibility. The magnesium compound having reducibility is, for example, a magnesium compound having a magnesium-carbon bond or a magnesium-hydrogen bond. Specific examples of the magnesium compound having reducibility include dialkyl magnesiums such as dimethyl magnesium, diethyl magnesium, dipropyl magnesium, dibutyl magnesium, ethylbutyl magnesium, diamyl magnesium, dihexyl magnesium and didecyl magnesium; monoalkyl magnesium monohalides such as ethyl magnesium chloride, propyl magnesium chloride, butyl magnesium chloride, hexyl magnesium chloride and amyl magnesium chloride; butylethoxymagnesium; and butyl magnesium halides. These magnesium compounds may be used as such or as a complex with an organoaluminum compound to be described. These magnesium compounds may be in the liquid or solid state.

Specific examples of the magnesium compound having no reducibility include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate.

The magnesium compound having no reducibility may be a compound derived from the magnesium compound having reducibility separately or at the time of preparing the catalyst component. This is effected, for example, by contacting the magnesium compound having reducibility with such a compound as a polysiloxane compound, a halogen-containing silane compound, a halogen-containing aluminum compound, an ester or an alcohol. In addition to the above magnesium compounds having reducibility and those having no reducibility, the magnesium compound used in this invention may also be a complex compound or a double compound with another metal or a mixture with another metal compound.

In one aspect of the present invention, the magnesium compounds having no reducibility are preferred. In another aspect of the present invention, halogen-containing magnesium compounds, such as magnesium chloride, alkoxy magnesium chlorides and aryloxy magnesium chlorides, are preferred.

In one embodiment of the preparation of the solid titanium catalyst component (A), it is preferred to use an internal electron donor, for example, oxygen-containing electron donors such as alcohols, certain organosilicon compounds, phenols, ketones, aldehydes, carboxylic acids, organic or inorganic acid esters, ethers, acid amides and acid anhydrides, and nitrogen-containing electron donors such as ammonia, amines, nitriles and isocyanates. Specific examples include alcohols having 1 to about 18 carbon atoms which may have an alkyl group such as methanol, ethanol, propanol, pentanol, hexanol, octanol, 2-ethylhexanol, dodecanol, octadecyl alcohol, benzyl alcohol, phenylethyl alcohol, cumyl alcohol and isopiropylbenzyl alcohol; phenols having 6 to about 25 carbon atoms such as phenol, resol, xylenol, ethylphenol, propylphenol, cumylphenol, nonylphenol and naphthol; ketones having about 3 to about 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioctyl phthalate, gamma-butyrolactone, delta-valerolactone, coumarine, phthalide and ethylene carbonate; inorganic acid esters such as ethyl silicate, butyl silicate, vinyltriethoxysilane, phenyltriethoxysilane and diphenyidiethoxysilane; acid halides having 2 to about 15 carbon atoms such as acetyl chloride, benzoyl chloride, tolyl chloride, anisoyl chloride and phthaloyl dichloride; ethers having 2 to about 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

An organosilicon compound represented by Formula (II)

wherein R and R' represent a hydrocarbon group, and n is $0 \leq n \leq 4$ may also be used as the internal electron donor. Specific examples of the organosilicon compound of Formula (II) include trimethylmethoxysilane, trimethylethoxysilane, dimethyidimethoxysilane, dimethyldiethoxysilane, diisopropyidimethoxysilane, t-butylmethyidimethoxysilane, t-butylmethyldiethoxysilane, t-amylmethyidiethoxysilane, diphenyidimethoxysilane, phenylmethyidimethoxysilane, diphenyldiethoxysilane, bis-o-tolyidimethoxysilane, bis-m-tolyidimethoxysilane, bis-p-tolyidimethoxysilane, bis-p-totyidiethoxysilane, bisethylphenyldimethoxysilane, dicyclohexyldimethoxysilane, cyclohexylmethyldimethoxysilane, cyclohexylmethyidiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, and dimethyltetraethoxydisiloxane.

Esters may also be employed as internal electron donors for use with the titanium catalyst component. Examples of these esters are compounds represented by the following formulae

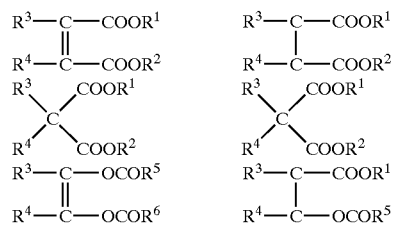

wherein $R^1$ represents a substituted or unsubstituted hydrocarbon group, and $R^2$, $R^5$ and $R^6$ represent a hydrogen atom or a substituted or unsubstituted hydrocarbon group, $R^3$ and $R^4$ represent a hydrogen atom or a substituted or unsubstituted hydrocarbon group, at least one of them is preferably a substituted or unsubstituted hydrocarbon group, and $R^3$ and $R^4$ may be linked to each other. In one embodiment, the substituted or unsubstituted hydrocarbon groups contain from 1 to about 30 carbon atoms.

Examples of the substituted hydrocarbon groups for $R^1$ through $R^5$ are hydrocarbon groups having groups containing hetero atoms such as N, O, and S, for example, C—O—C, COOR, COOH, OH, $SO_3H$, —C—N—C— and $NH_2$. Especially preferred are diesters of dicarboxylic acids in which at least one of R' and $R^2$ is an alkyl group having at least about 2 carbon atoms.

Specific examples of polycarboxylic acid esters include aliphatic polycarboxylic acid esters such as diethyl succinate, dibutyl succinate, diethyl methylsuccinate, diisobutyl alpha-methylglutarate, dibutyl malonate, diethyl methylmalonate, diethyl ethylmalonate, diethyl isopropylmalonate, diethyl butyl malonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and Nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethlisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate; and heterocyclic polycarboxylic acid esters such as 3,4- furanedicarboxylic acid esters. Specific examples of the polyhydroxy compound esters may include 1,2-diacetoxybenzene, 1-methyl-2,3-diacetoxybenzene, 2-methyl-2,3-diacetoxybenzene, 2,8-diacetoxynaphthalene, ethylene glycol dipivalate and butanediol pivalate. Specific examples of the hydroxy-substituted carboxylic acid esters are benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae are preferred. Also preferred are esters formed between phthalic acid, maleic acid or substituted malonic acid and alcohols having at least about 2 carbon atoms, diesters formed between phthalic acid and alcohols having at least about 2 carbon atoms are especially preferred.

Another group of internal electron donors that can be included in the titanium catalyst component are monocarboxylic acid esters represented by RCOOR' where R and R' are hydrocarboyl groups that may have a substituent, and at least one of them is a branched (including alicyclic) or ring-containing aliphatic group. Specifically, at least one of R and R' may be $(CH_3)_2CH-$, $C_2H_5CH(CH_3)$, $(CH_3)_2CHCH_2-$, $(CH_3)_3C-$, $C_2H_5CH-$, $(CH_3)CH_2-$, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as isopropanol, isobutanol and tert-butanol.

Carbonic acid esters may also be used as the internal electron donor. Specific examples are diethyl carbonate, ethylene carbonate, diisopropyl carbonate, phenylethyl carbonate and diphenyl carbonate.

The optional internal electron donors may be used individually or in combination. In employing the internal electron donor, they do not have to be used directly as starting materials, but compounds convertible to the electron donors in the course of preparing the titanum catalyst components may also be used as the starting materials.

In the present invention, the solid titanium catalyst component (A) may be produced by contacting the magnesium compound (or metallic magnesium) and the titanium compound and optionally, the internal electron donor by known methods used to prepare a highly active titanium catalyst component from a magnesium compound, a titanium compound and optionally an electron donor. The above compounds may be contacted in the presence of another reaction agent such as silicon, phosphorus or aluminum Several examples of the method of producing the solid titanium catalyst component (A) are briefly described below.

(1) The magnesium compound or the complex of the magnesium compound optionally with the internal electron donor, is reacted with the titanium compound in the liquid phase. This reaction may be carried out in the presence of a pulverizing agent. Compounds which are solid may be pulverized before the reaction.

(2) The magnesium compound having no reducibility and the titanium compounds, both in liquid form, are reacted in the presence of the optional internal electron donor to precipitate a solid titanium complex.

(3) The reaction product obtained in (2) is further reacted with the titanium compound.

(4) The reaction product obtained in (1) or (2) is further reacted with the internal electron donor and the titanium compound.

(5) The magnesium compound or a complex of the magnesium compound and the optional internal electron donor is pulverized in the presence of the titanium compound, and the resulting solid product is treated with a halogen, a halogen compound or an aromatic hydrocarbon. In this method, the magnesium compound or the complex of it with the electron donor may be pulverized in the presence of a pulverizing agent, etc. Alternatively, the magnesium compound or the complex of the magnesium compound and the optional internal electron donor is pulverized in the presence of the titanium compound, preliminarily treated with a reaction aid and thereafter, treated with halogen, etc. The reaction aid may be an organoaluminum compound or a halogen-containing silicon compound.

(6) The product obtained in (1) to (4) is treated with a halogen, a halogen compound or an aromatic hydrocarbon.

(7) A product obtained by contacting a metal oxide, dihydrocarbyl magnesium and a halogen-containing alcohol is contacted with the optional internal electron donor and the titanium compound.

(8) A magnesium compound such as a magnesium salt of an organic acid, an alkoxy magnesium or an aryloxy magnesium is reacted with the optional internal electron donor, the titanium compound andlor a halogen-containing hydrocarbon.

In embodiments of making the catalyst component (A) according to examples (2), (3), (4) and (6), the magnesium halide solution is mixed with liquid titanium tetrahalide to form a solid precipitate in the presence of an auxiliary precipitant. A polycarboxylic acid ester may be added before, during or after the precipitation of the solids and loaded on the solid.

The process of solids precipitation can be carried out by one of two methods. One method involves mixing liquid titanium tetrahalide with magnesium halide at a temperature in the range of about −40° C. to about 0° C., and precipitating the solids while the temperature is raised slowly to a range of about 30° C. to about 120° C., preferably about 60° C. to about 100° C. The other method involves adding liquid titanium tetrahalide dropwise into the homogeneous magnesium halide solution at room temperature to precipitate out solids immediately. In both methods, an internal electron donor is desirably present in the reaction system. The optional internal electron donor can be added either after the magnesium halide solution is obtained or together with magnesium halide in step 1. Alternatively, two or more auxiliary precipitants can be added simultaneously.

The solids are treated by adding a polycarboxylic acid ester into the system after the precipitation process. Alternatively, a polycarboxylic acid ester can be added during the precipitation process. A mixture of two or more polycarboxylic acid esters can be used.

In order to obtain uniform solid particles, the process of precipitation can be carried out slowly. When the second method of adding titanium halide dropwise at room temperature is applied, the process preferably takes place over a period from about 1 hour to about 6 hours. When the first method of raising the temperature in a slow manner is applied, the rate of temperature increase preferably ranges from about 4° C. to about 100° C. per hour.

The solid precipitate is first separated from the mixture. In the solid precipitate thus obtained may be entrained a variety of complexes and impurities, so that further treatment may in some instances be necessary.

The solid precipitate is washed with an inert diluent and then treated with titanium tetrahalide or a mixture of titanium tetrahalide and an inert diluent. The titanium tetrahalide used in this step is identical to or different with the titanium tetrahalide used in step 2, with titanium tetrachloride being most preferred. The amount of titanium tetrahalide used is from about 1 to about 20 moles, preferably from about 2 to about 15 moles, per mole of magnesium halide. The treatment temperature ranges from 50° C. to about 150° C., preferably from about 60° C. to about 100° C. If a mixture of titanium tetrahalide and inert diluent is used to treat the solid precipitate, the volume % of titanium tetrahalide in the treating solution is from about 10% to about 100%, the rest being an inert diluent.

The treated solids are further washed with an inert diluent to remove ineffective titanium compounds and other impurities. The inert diluent herein used can be hexane, heptane, octane, 1,2-dichloroethane, benzene, toluene and other hydrocarbons. 1,2-dichloroethane is one of the preferred diluents in the final washing step.

In one embodiment, particularly embodiments following example (2) described above, the solid catalyst component (A) has the following chemical composition: titanium, from about 1.5 to about 6.0 wt %; magnesium, from about 10 to about 20 wt %; halogen, from about 40 to about 70 wt %; polycarboxylic acid ester, from about 5 to about 25 wt %; optionally organic phosphorus compounds, from about 0.1 to about 2.5 wt %; and optionally inert diluent from about 0 to about 15 wt %.

The amounts of the ingredients used in preparing the solid titanium catalyst component (A) may vary depending upon the method of preparation. In one embodiment, from about 0.01 to about 5 moles of the internal electron donor and from about 0.01 to about 500 moles of the titanium compound are used per mole of the magnesium compound. In another embodiment, from about 0.05 to about 2 moles of the internal electron donor and from about 0.05 to about 300 moles of the titanium compound are used per mole of the magnesium compound.

In one embodiment, in the solid titanium catalyst component (A), the atomic ratio of halogen/titanium is from about 4 to about 200; the internal electron donor/titanium mole ratio is from about 0.01 to about 10; and the magnesium/titanium atomic ratio is from about 1 to about 100. In another embodiment, in the solid titanium catalyst component (A), the atomic ratio of halogen/titanium is from about 5 to about 100; the internal electron donor/titanium mole ratio is from about 0.2 to about 6; and the magnesium/titanium atomic ratio is from about 2 to about 50.

The resulting solid titanium catalyst component (A) generally contains a magnesium halide of a smaller crystal size than commercial magnesium halides and usually has a specific surface area of at least about 50 m$^2$/g, preferably from about 60 to 1,000 m$^2$/g, more preferably from about 100 to 800 m$^2$/g. Since, the above ingredients are unified to form an integral structure of the solid titanium catalyst component (A), the composition of the solid titanium catalyst component (A) does not substantially change by washing with hexane.

The solid titanium catalyst component (A) may be used alone. If desired, it can be used after being diluted with an inorganic or organic compound such as a silicon compound, an aluminum compound or a polyolefin. In some instances when such a diluent is used, the catalyst component (A) may show high catalytic activity even when it has a lower specific surface than that described above.

Methods of preparing the active catalyst component, which can be used in the present invention, are described in U.S. Pat. Nos. 4,771,023; 4,784,983; 4,829,038; 4,861,847; 4,990,479; 5,177,043; 5,194,531; 5,244,989; 5,438,110; 5,489,634; 5,576,259; and 5,773,537; which are hereby incorporated by reference in this regard.

Compounds having at least one aluminum-carbon bond in the molecule can be used as the organoaluminum compound as catalyst component (B). Examples of organoaluminum compounds include compounds of the following Formulae (III) and (IV).

$$R_m^{11}Al(OR^{12})_nH_pX_q^1 \quad (III)$$

In Formula (III), $R^{11}$ and $R^{12}$ may be identical or different, and each represent a hydrocarbon group usually having 1 to about 15 carbon atoms, preferably 1 to about 4 carbon atoms; $X^1$ represents a halogen atom, $0<3$, $0 \leq p<3$, $0 \leq n<3$, and $m+n+p+q=3$.

Organoaluminum compounds further include complex alkylated compounds between aluminum and a metal of Group I represented by Formula (IV)

$$M^1AlR_4^{11} \quad (IV)$$

wherein $M^1$ represents Li, Na or K, and $R^{11}$ is as defined above.

Examples of the organoaluminum compounds Formula (III) are as follows:

compounds of the general formula $R_m^{11}Al(OR^{12})_3$-m wherein $R^{11}$ and $R^{12}$ are as defined, and m is preferably a number represented by $1.5 \leq m \leq 3$;

compounds of the general formula $R_m^{11}AlX_3$-m$^1$ wherein $R^{11}$ is defined, $X^1$ is halogen, and m is preferably a number represented by $0<M<3$;

compounds of the general formula $R_m^{11}AlH_3$-m wherein $R^{11}$ is as defined above, and m is preferably a number represented by $2 \leq m<3$; and compounds represented by the general formula $R_m^{11}Al(OR^{12})_nX_q^1$ wherein $R^{11}$ and $R^{12}$ are as defined, $X^1$ is halogen, $0<3$, $0 \leq n<3$, $m+n+q=$"3."

Specific examples of the organoaluminum compounds represented by Formula (III) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^{11}Al(OR^{12})_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride;

and partially alkoxylated and halogenated alkyl aluminums such as ethyl aluminum ethoxychloride, butyl aluminum butoxychloride and ethyl aluminum ethoxybromide.

Organoaluminum compounds further include those similar to Formula (III) such as in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$,

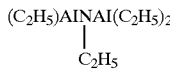

and methylaluminoxane.

Examples of organoaluminum compounds represented by Formula (IV) include $LiAl(C_2H_5)_4$ and $LiAl(C_7H_{15})_4$.

The organoaluminum compound catalyst component (B) is used in the catalyst system of the present invention in an amount that the mole ratio of aluminum to titanium (from the catalyst component (A)) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

Catalyst component (C) is an organosilicon compound containing in its structure a (cycloalkyl)methyl group, or a derivative of any one of these groups may be used, such as a norpinanes and pinanes. In one embodiment, the organosilicon compound contains one (cycloalkyl)methyl moiety. In another embodiment, the organosilicon compound contains two (cycloalkyl)methyl moieties that are the same or different.

Organosilicon compounds containing at least one (cycloalkyl)methyl moiety can be represented by Formula (V):

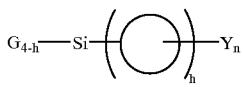
(V)

wherein the circle represents one or more cycloalkyl moieties, each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2. The alkoxy, alkyl, and hydrocarbon groups typically contain 1 to about 8 carbon atoms.

Organosilicon compounds containing at least one (cycloalkyl)methyl moiety can also be represented by one or more of Formulae (VI), (VII), (VIII), (IX), and (X):

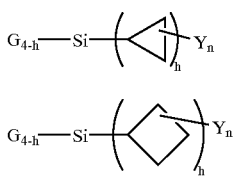
(VI)
(VII)

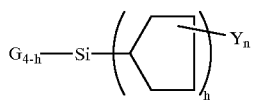
(VIII)

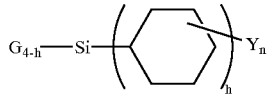
(IX)

(X)

wherein each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2.

Additional examples of organosilicon compounds are those of the following Formulae (XI), (XII), (XIII), (XIV), (XV), (XVI), (XVII), (XVIII), (XIX), (XX), (XXI), and (XXII):

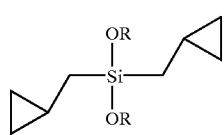
(XI)

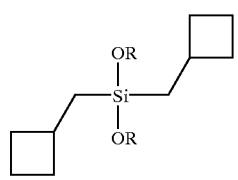
(XII)

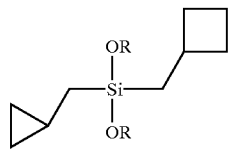
(XIII)

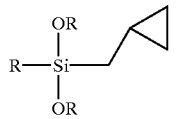
(XIV)

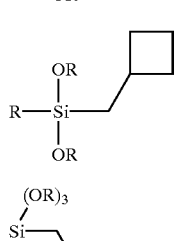
(XV)
(XVI)

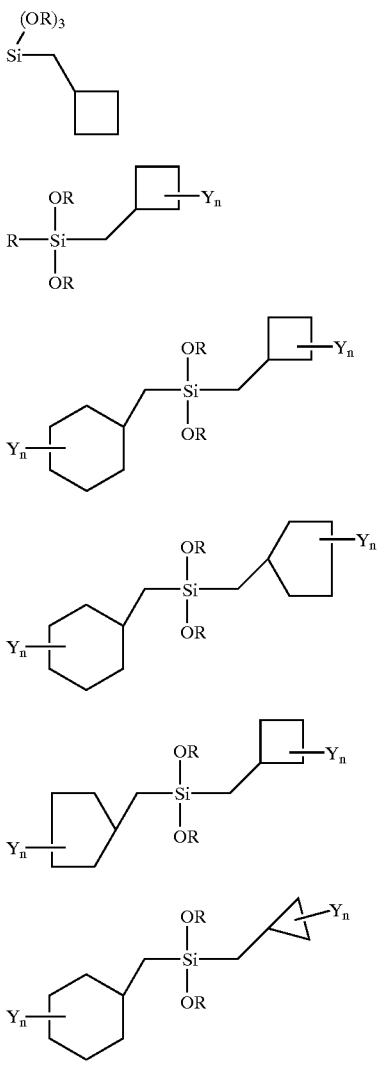

(XVII)

(XVIII)

(XIX)

(XX)

(XXI)

(XXII)

wherein each R is independently a hydrocarbon group including alkyl groups, such as methyl, ethyl, propyl, butyl, cyclopropyl, cyclopentyl, cyclohexyl, and 2-ethylhexyl groups; each Y is independently a hydrocarbon group including those mentioned above, hydroxy, or halogen; and n is 0 to 3, 0 to 2, or 1 to 2.

Although not shown in Formulae (XI) to (XVII), substituent Y may be optionally present in these formulae on any of the (cycloalkyl)methyl groups. For example, one or more Y groups may be present on the (cyclopropyl)methyl group of Formula (XVI).

Examples of organosilicon compound containing in its structure a (cycloalkyl)methyl group, or a derivative of any one of these groups include bis{(cyclobutyl) methyl}dimethoxysilane, bis{(cyclopropyl) methyl}dimethoxysilane, bis{(cyclopentyl) methyl}dimethoxysilane, bis{(cyclohexyl) methyl}dimethoxysilane, bis{(cycloheptyl) methyl}dimethoxysilane, (cyclobutyl)methyl (cyclopropyl) methyl dimethoxysilane, (cyclopentyl)methyl (cyclopropyl) methyl dimethoxysilane, (cyclohexyl)methyl (cyclopropyl) methyl dimethoxysilane, (cycloheptyl)methyl (cyclopropyl) methyl dimethoxysilane, (cyclobutyl)methyl (cyclopentyl) methyl dimethoxysilane, (cyclobutyl)methyl (cyclohexyl) methyl dimethoxysilane, (cyclobutyl)methyl (cycloheptyl) methyl dimethoxysilane, (cyclopentyl)methyl (cyclohexyl) methyl dimethoxysilane, (cyclopentyl)methyl (cycloheptyl) methyl dimethoxysilane, (cyclohexyl)methyl (cycloheptyl) methyl dimethoxysilane, (cyclobutyl)methyl cyclobutyl dimethoxysilane, (cyclobutyl)methyl methyl dimethoxysilane, (cyclopropyl)methyl methyl dimethoxysilane, (cyclopropyl)methyl isopropyl dimethoxysilane, (cyclopropyl)methyl butyl dimethoxysilane, (cyclopropyl)methyl cyclopentyl dimethoxysilane, (cyclopropyl)methyl cyclohexyl dimethoxysilane, (cyclopropyl)methyl 2-ethylhexyl dimethoxysilane, (cyclobutyl)methyl methyl dimethoxysilane, (cyclobutyl)methyl isopropyl dimethoxysilane, (cyclobutyl)methyl butyl dimethoxysilane, (cyclobutyl)methyl cyclopentyl dimethoxysilane, (cyclobutyl)methyl cyclohexyl dimethoxysilane, (cyclobutyl)methyl 2-ethylhexyl dimethoxysilane, (cyclopentyl)methyl cyclobutyl dimethoxysilane, (cyclopentyl)methyl methyl dimethoxysilane, (cyclohexyl)methyl methyl dimethoxysilane, (cyclohexyl)methyl isopropyl dimethoxysilane, (cyclohexyl)methyl butyl dimethoxysilane, (cyclohexyl)methyl cyclopentyl dimethoxysilane, (cyclohexyl)methyl cyclohexyl dimethoxysilane, (cyclohexyl)methyl 2-ethylhexyl dimethoxysilane, (cyclopentyl)methyl methyl dimethoxysilane, (cyclopentyl)methyl isopropyl dimethoxysilane, (cyclopentyl)methyl butyl dimethoxysilane, (cyclopentyl)methyl cyclopentyl dimethoxysilane, (cyclopentyl)methyl cyclohexyl dimethoxysilane, (cyclopentyl)methyl 2-ethylhexyl dimethoxysilane, (cycloheptyl)methyl cyclobutyl dimethoxysilane, (cycloheptyl)methyl methyl dimethoxysilane, (cycloheptyl)methyl methyl dimethoxysilane, (cycloheptyl)methyl isopropyl dimethoxysilane, (cycloheptyl)methyl butyl dimethoxysilane, (cycloheptyl)methyl cyclopentyl dimethoxysilane, (cycloheptyl)methyl cyclohexyl dimethoxysilane, (cycloheptyl)methyl 2-ethylhexyl dimethoxysilane, (cyclopropyl)methyl trimethoxysilane, (cyclobutyl)methyl trimethoxysilane, (cyclopentyl)methyl trimethoxysilane, (cyclohexyl)methyl trimethoxysilane, (cycloheptyl)methyl trimethoxysilane, bis{(cyclobutyl) methyl}diethoxysilane, bis{(cyclopropyl) methyl}diethoxysilane, bis{(cyclopentyl) methyl}diethoxysilane, bis{(cyclohexyl) methyl}diethoxysilane, bis{(cycloheptyl) methyl}diethoxysilane, (cyclobutyl)methyl (cyclopropyl) methyl diethoxysilane, (cyclopentyl)methyl (cyclopropyl) methyl diethoxysilane, (cyclohexyl)methyl (cyclopropyl) methyl diethoxysilane, (cycloheptyl)methyl (cyclopropyl) methyl diethoxysilane, (cyclobutyl)methyl (cyclopentyl) methyl diethoxysilane, (cyclobutyl)methyl (cyclohexyl) methyl diethoxysilane, (cyclobutyl)methyl (cycloheptyl) methyl diethoxysilane, (cyclopentyl)methyl (cyclohexyl) methyl diethoxysilane, (cyclopentyl)methyl (cycloheptyl) methyl diethoxysilane, (cyclohexyl)methyl (cycloheptyl) methyl diethoxysilane, (cyclobutyl)methyl cyclobutyl diethoxysilane, (cyclobutyl)methyl methyl diethoxysilane, (cyclopropyl)methyl methyl diethoxysilane, (cyclopropyl) methyl isopropyl diethoxysilane, (cyclopropyl)methyl butyl diethoxysilane, (cyclopropyl)methyl cyclopentyl diethoxysilane, (cyclopropyl)methyl cyclohexyl diethoxysilane, (cyclopropyl)methyl 2-ethylhexyl diethoxysilane, (cyclobutyl)methyl methyl diethoxysilane, (cyclobutyl)methyl isopropyl diethoxysilane, (cyclobutyl)

methyl butyl diethoxysilane, (cyclobutyl)methyl cyclopentyl diethoxysilane, (cyclobutyl)methyl cyclohexyl diethoxysilane, (cyclobutyl)methyl 2-ethylhexyl diethoxysilane, (cyclopentyl)methyl cyclobutyl diethoxysilane, (cyclopentyl)methyl methyl diethoxysilane, (cyclohexyl)methyl methyl diethoxysilane, (cyclohexyl)methyl isopropyl diethoxysilane, (cyclohexyl)methyl butyl diethoxysilane, (cyclohexyl)methyl cyclopentyl diethoxysilane, (cyclohexyl)methyl cyclohexyl diethoxysilane, (cyclohexyl)methyl 2-ethylhexyl diethoxysilane, (cyclopentyl)methyl methyl diethoxysilane, (cyclopentyl)methyl isopropyl diethoxysilane, (cyclopentyl)methyl butyl diethoxysilane, (cyclopentyl)methyl cyclopentyl diethoxysilane, (cyclopentyl)methyl cyclohexyl diethoxysilane, (cyclopentyl)methyl 2-ethylhexyl diethoxysilane, (cycloheptyl)methyl cyclobutyl diethoxysilane, (cycloheptyl)methyl methyl diethoxysilane, (cycloheptyl)methyl methyl diethoxysilane, (cycloheptyl) methyl isopropyl diethoxysilane, (cycloheptyl)methyl butyl diethoxysilane, (cycloheptyl)methyl cyclopentyl diethoxysilane, (cycloheptyl)methyl cyclohexyl diethoxysilane, (cycloheptyl)methyl 2-ethylhexyl diethoxysilane, (cyclopropyl)methyl triethoxysilane, (cyclobutyl)methyl triethoxysilane, (cyclopentyl)methyl triethoxysilane, (cyclohexyl)methyl triethoxysilane, and (cycloheptyl)methyl triethoxysilane.

The organosilicon compounds of the present invention can be prepared by various methods. In one method, one or two equivalents of a cyclopropyl/cyclobutyl Gringnard reagent (i.e., a Grignard reagent having a (cyclopropyl) methyl or (cyclobutyl)methyl group, respectively) is reacted with an orthosilicate, such as tetramethylorthosilicate or tetraethylorthosilicate. The reactant is then purified by vacuum distillation, if appropriate. Tetramethylorthosilicate and tetraethylorthosilicate are made by reacting silicon tetrachloride with either four equivalents of methanol or ethanol.

Examples of Grignard reagents having a (cycloalkyl) methyl group include those represented by Formula (XXIII)

$$MgXR^{13} \quad (XXIII)$$

wherein X is a halogen atom such as chlorine or bromine, and $R^{13}$ is an organic group containing a (cycloalkyl)methyl group. Examples of organic groups include a substituted or unsubstituted (cyclopropyl)methyl group, a substituted or unsubstituted (cyclobutyl)methyl group a substituted or unsubstituted (cyclopentyl)methyl group, a substituted or unsubstituted (cyclohexyl)methyl group, and a substituted or unsubstituted (cycloheptyl)methyl group.

In another method, the organosilicon compound catalyst system component (C) is obtained by the reaction of a monocycloalkyltrialkoxysilane (i.e., mono(cyclopropyl) methyl-, mono(cyclobutyl)methyl-, mono(cyclopentyl) methyl-, mono(cyclohexyl)methyl-, mono(cycloheptyl) methyl-trialkoxysilane) with a (cycloalkyl)methyl Grignard reagent. For example, (cyclopropyl)chloromethane is first reacted with magnesium in the presence of a solvent, e.g., an ether such as tetrahydrofuran, diethyl ether, or di-n-butyl ether, to yield a (cyclopropyl)methyl Grignard reagent ((cyclopropyl)methyl magnesium chloride). This reaction may be carried out at a temperature from about room temperature to about 60° C. The (cyclopropyl)methyl Grignard reagent is then reacted with (cyclopropyl)methyl trimethoxysilane to obtain bis{(cyclopropyl) methyl}dimethoxysilane; this reaction may be conducted in the presence of an ether such as tetrahydrofuran, diethyl ether, or di-n-butyl ether, or in the presence of an aliphatic hydrocarbon solvent such as hexane or heptane or an aromatic hydrocarbon solvent such as toluene, benzene, or xylene. This reaction may be carried out at a temperature from about 50° C. to about 200° C., preferably at a temperature from about 100° C. to about 200° C. or at a temperature from about 100° C. to about 200° C. under boiling or refluxing of the solvent.

Although the mono(cycloalkyl)methyltrialkoxysilane for use in the above reaction may be a commercial product, it may be prepared by various known methods. In one method, the desired compound is prepared by reacting (cycloalkyl) methyltrichlorosilane with methanol to alkoxylate the silane compound with the evolution of hydrogen chloride. Although the (cycloalkyl)methyltrichlorosilane for use in this reaction may be a commercial product, it may be prepared by the hydrosilylation reaction of (cycloalkyl) methane with trichlorosilane ($HSiCl_3$).

The (cycloalkyl)methyl organosilicon compounds thus produced can be identified by one or more of nuclear magnetic resonance spectroscopy ($^1$H-NMR, $^{13}$C-NMR), infrared absorption spectrometry, gas chromatography-mass spectrometry, etc.

The organosilicon compound of the present invention, when used as an electron donor serving as one component of a Ziegler-Natta catalyst system for olefin polymerization, makes it possible to obtain a polymer (at least a portion of which is polyolefin) having a broad molecular weight distribution and controllable crystallinity while retaining high performance with respect to catalytic activity and the yield of highly stereoregular polymer.

The organosilicon compound (C) is used in the catalyst system of the present invention in an amount that the mole ratio of the organoaluminum compound (B) to the (cycloalkyl)methyl organosilicon compound is from about 2 to about 90. In another embodiment, the mole ratio of the organoaluminum compound to the (cycloalkyl)methyl organosilicon compound is from about 5 to about 70. In yet another embodiment, the mole ratio of the organoaluminum compound to the (cycloalkyl)methyl organosilicon compound is from about 7 to about 35.

In addition to the organosilicon compounds described above, the catalyst system or catalyst component (C) may optionally further include one or more supplementary organosilicon compounds. For example, in one aspect of the present invention, the supplementary organosilicon compound is represented by Formula (XXIV):

$$R^{14}_n Si(OCR^{15})_{4-n} \quad (XXIV)$$

wherein $R^{14}$ and $R^{15}$ represent a hydrocarbon group, and n is $0 \leq n < 4$.

Specific examples of the supplementary organosilicon compounds of Formula (XXIV) include trimethylmethoxysilane, trimethylethoxysilane, dimethyidimethoxysilane, dimethyidiethoxysilane, diisopropyldimethoxysilane, t-butylmethyldimethoxysilane, t-butylmethyidiethoxysilane, t-amylmethyidiethoxysilane, diphenyidimethoxysilane, phenylmethyldimethoxysilane, diphenyidiethoxysilane, bis-o-tolyidimethoxysilane, bis-m-tolyidimethoxysilane, bis-p-tolyldimethoxysilane, bis-p-totyidiethoxysilane, bisethylphenyidimethoxysilane, dicyclohexyldimethoxysilane, cyclohexylmethyidimethoxysilane, cyclohexylmethyidiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyidimethoxysilane, ethyl silicate, butyl silicate, trimethylphenoxysilane, methyltriallyloxysilane, vinyltris(beta-methoxyethoxysilane), vinyltriacetoxysilane, and dimethyltetraethoxydisiloxane.

In another aspect of the present invention, the supplementary organosilicon compound is represented by Formula (XXV)

$$SiR^{21}R_m^{22}(OR^{23})_{3-m} \quad (XXV)$$

In the above Formula (XXV), $0 \leq 3$, preferably $0 \leq m \leq 2$; and $R^{21}$ represents a cyclopentyl group, a cyclopentenyl group, a cyclopentadienyl group or a derivative of any of these. The derivative may preferably be, for example, a cyclopentyl group substituted by 1 to about 4 alkyl groups having 1 to about 4 carbon atoms, an alkyl group having 2 to about 4 carbon atoms substituted by a cyclopentyl group which may be substituted by 1 to about 4 alkyl groups having 1 to about 4 carbon atoms, a cyclopentenyl group substituted by 1 to about 4 alkyl groups having 1 to about 4 carbon atoms, a cyclopentadienyl group substituted by 1 to about 4 alkyl groups having 1 to about 4 carbon atoms, or an indenyl, indanyl, tetrahydroindenyl or fluorenyl group which may be substituted by 1 to about 4 alkyl groups having 1 to about 4 carbon atoms.

Specific examples of the group $R^{21}$ include cyclopentyl, 2-methylcyclopentyl, 3-methylcyclopentyl, 2-ethylcyclopentyl, 3-propylcyclopentyl, 3-isopropylcyclopentyl, 3-butylcyclopentyl, 3-tertiary butyl cyclopentyl, 2,2-dimethylcyclopentyl, 2,3-dimethylcyclopentyl, 2,5-dimethylcyclopentyl, 2,2,5-trimethylcyclopentyl, 2,3,4,5-tetramethylcyclopentyl, 2,2,5,5-tetramethylcyclopentyl, 1-cyclopentylpropyl, 1-methyl-1-cyclopentylethyl, cyclopentenyl, 2-cyclopentenyl, 3-cyclopentenyl, 2-methyl-1-cyclopentenyl, 2-methyl-3-cyclopentenyl, 3-methyl-3-cyclopentenyl, 2-ethyl-3-cyclopentenyl, 2,2-dimethyl-3-cyclopentenyl, 2,5-dimethyl-3-cyclopentenyl, 2,3,4,5-tetramethyl-3-cyclopentenyl, 2,2,5,5-tetramethyl-3-cyclopentenyl, 1,3-cyclopentadienyl, 2,4-cyclopentadienyl, 1,4-cyclopentadienyl, 2-methyl-1,3-cyclopentadienyl, 2-methyl-2,4-cyclopentadienyl, 3-methyl-2,4-cyclopentadienyl, 2-ethyl-2,4-cyclopentadienyl, 2-dimethyl-2,4-cyclopentadienyl, 2,3-dimethyl-2,4-cyclopentadienyl, 2,5-dimethyl-2,4-cyclopentadienyl, 2,3,4,5-tetramethyl-2,4-cyclopentadienyl, indenyl, 2-methylindenyl, 2-ethylindenyl, 2-indenyl, 1-methyl-2-indenyl, 1,3-dimethyl-2-indenyl, indanyl, 2-methylindanyl, 2-indanyl, 1,3-dimethyl-2-indanyl, 4,5,6,7-tetrahydroindenyl, 4,5,6,7-tetrahydro-2-indenyl, 4,5,6,7-tetrahydro-1-methyl-2-indenyl, 4,5,6,7-tetrahydro-1,3-dimethyl-2-indenyl, and fluorenyl groups.

In Formula (XXV), $R^{22}$ and $R^{23}$ are identical or different and each represents a hydrocarbon. Examples of $R^{22}$ and $R^{23}$ are alkyl, cycloalkyl, aryl and aralkyl groups having 5 or more carbon atoms. Furthermore, $R^{21}$ and $R^{22}$ may be bridged by an alkyl group, etc. Preferred supplemental organosilicon compounds are those of Formula (XXV) in which $R^{21}$ is a cyclopentyl group, $R^{22}$ is an alkyl group or a cyclopentyl group, and $R^{23}$ is an alkyl group, particularly a methyl or ethyl group.

Specific examples of the supplemental organosilicon compounds of Formula (XXV) include trialkoxysilanes such as cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyl triethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyidimethoxysilane, bis(2-methylcyclopentyl) dimethoxysilane, bis(3-tertiary butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclopentenyidimethoxysilane, di(3-cyclopentenyl) dimethoxysilane, bis(2,5-dimethyl-3-cyclopentenyl) dimethoxysilane, di-2,4-cyclopentadienyidimethoxysilane, bis(2,5-dimethyl-2,4-cyclopentadienyl)dimethoxysilane, bis (1-methyl-1-cyclopentylethyl)dimethoxysilane, cyclopentylcyclopentenyldimethoxysilane, cyclopentylcyclopentadienyidimethoxysilane, diindenyidimethoxysilane, bis(1,3-dimethyl-2-indenyl) dimethoxysilane, cyclopentadienylindenyidimethoxysilane, difluorenyldimethoxysilane, cyclopentylfluorenyldimethoxysilane and indenylfluorenyidimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyidimethylmethoxysilane, cyclopentyidiethylmethoxysilane, cyclopentyldimethylethoxysilane, bis(2,5-dimethylcyclopentyl)cyclopentylmethoxysilane, dicyclopentyl cyclopentenylmethoxysilane, dicyclopentylcyclopentadienylmethoxysilane and diindenylcyclopentylmethoxysilane; and ethylenebis-cyclopentyldimethoxysilane.

Polymerization of olefins in accordance with the present invention is carried out in the presence of the catalyst system described above. In one embodiment, preliminary polymerization described below is carried out before the main polymerization. In another embodiment, polymerization is carried out without preliminary polymerization.

In preliminary polymerization, the solid titanium catalyst component (A) is usually employed in combination with at least a portion of the organoaluminum compound (B). This may be carried out in the presence of part or the whole of the organosilicon compound (C) (and optionally a supplementary organosilicon compound). The concentration of the catalyst system used in the preliminary polymerization may be much higher than that in the reaction system of the main polymerization.

In preliminary polymerization, the concentration of the solid titanium catalyst component (A) in the preliminary polymerization is usually from about 0.01 to about 200 millimoles, preferably from about 0.05 to about 100 millimoles, calculated as titanium atoms per liter of an inert hydrocarbon medium described below. Preferably, the preliminary polymerization is carried out by adding an olefin and the above catalyst system ingredients to an inert hydrocarbon medium and reacting the olefin under mild conditions.

Specific examples of the inert hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the present invention, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20° C. to about 100° C. In another embodiment, the temperature is from about −10° C. to about 80° C. In yet another embodiment, the temperature is from about 0° C. to about 40° C.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135° C., of at least about 0.2 dl/g, and preferably from about 0.5 to 10 dl/g.

In one embodiment, the preliminary polymerization is desirably carried out so that from about 0.1 g to about 1,000 g of a polymer forms per gram of the titanium catalyst component (A) of the catalyst system. In another embodiment, the preliminary polymerization is desirably carried out so that from about 0.3 g to about 500 g of a polymer forms per gram of the titanium catalyst component (A). If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid titanium catalyst component (A), the organoaluminum compound (B) and the organosilicon compound (C).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the process of the present invention, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics. Furthermore, in this embodiment, a polymer having a high stereoregularity index can be produced with a high catalytic efficiency by polymerizing an alpha-olefin having at least about 3 carbon atoms.

In the homopolymerization or copolymerization of these olefins, a polyunsaturated compound such as a conjugated diene or a non-conjugated diene may be used as a comonomer. Examples of comonomers include styrene, butadiene, acrylonitrile, acrylamide, alpha-methyl styrene, chlorostyrene, vinyl toluene, divinyl benzene, diallylphthalate, alkyl methacrylates and alkyl acrylates. In one embodiment, the comonomers include thermoplastic and elastomeric monomers.

In the process of the present invention, the main polymerization of an olefin is carried out usually in the gaseous or liquid phase.

In one embodiment, when the main polymerization is carried out in a slurry reaction mode, the aforesaid inert hydrocarbon may be used as a reaction solvent. In another embodiment, an olefin which is liquid at the reaction temperature may alternatively be used as the reaction solvent. In yet another embodiment, an inert hydrocarbon and an olefin which is liquid at the reaction temperature may be employed as the reaction solvent.

In one embodiment, polymerization (main polymerization) of the present invention employs a catalyst system containing the titanium catalyst component (A) in an amount from about 0.001 to about 0.75 millimole calculated as Ti atom per liter of the volume of the polymerization zone, the organoaluminum compound (B) in an amount from about 1 to about 2,000 moles per mole of titanium atoms in the titanium catalyst component (A), and the organosilicon compound (C) in an amount from about 0.001 to about 10 moles calculated as Si atoms in the organosilicon compound (C) per mol of the metal atoms in the organoaluminum compound (B). In another embodiment, polymerization employs a catalyst system containing the titanium catalyst component (A) in an amount from about 0.005 to about 0.5 millimole calculated as Ti atom per liter of the volume of the polymerization zone, the organoaluminum compound (B) in an amount from about 5 to about 500 moles per mole of titanium atoms in the titanium catalyst component (A), and the organosilicon compound (C) in an amount from about 0.01 to about 2 moles calculated as Si atoms in the organosilicon compound (C) per mol of the metal atoms in the organoaluminum compound (B). In yet another embodiment, polymerization employs a catalyst system containing the organosilicon compound (C) in an amount from about 0.05 to about 1 mole calculated as Si atoms in the organosilicon compound (C) per mol of the metal atoms in the organoaluminum compound (B).

The catalyst components (A), (B) and (C) may be contacted at the time of the main polymerization or during the preliminary polymerization before the main polymerization. In this contacting before the main polymerization, any desired two components may be selected and contacted with each other, followed by the third component. Alternatively, only portions of two or three components may be contacted with each other. The catalyst system ingredients may be contacted before polymerization in an inert gas atmosphere, or in an olefin atmosphere.

When the organoaluminum compound (B) and the organosilicon compound (C) are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system are not decreased according to the methods of the present invention.

In one embodiment, the polymerization temperature of the present invention is from about 20° C. to about 200° C. In another embodiment, the polymerization temperature of the present invention is from about 50° C. to about 180° C. In one embodiment, the polymerization pressure is typically from about atmospheric pressure to about 100 kg/cm$^2$. In another embodiment, the polymerization pressure is typically from about 2 kg/cm$^2$ to about 50 kg/cm$^2$. The main polymerization may be carried out batchwise, semi-continuously or continuously. The polymerization may also be carried out in two or more stages under different reaction conditions.

The olefin polymer so obtained may be a homopolymer, a random copolymer or a block copolymer.

Since the yield of the stereoregular polymer obtained per unit amount of the solid titanium catalyst component in the present invention is high, the amount of the catalyst residue in the polymer, particularly its halogen content can be relatively decreased. Accordingly, an operation of removing the catalyst from the resulting polymer can be omitted, and corrosion of a mold can be effectively prevented in molding the olefin polymer into articles.

Furthermore, the olefin polymer obtained by using the catalyst system of the present invention has a very small amount of an amorphous polymer component and therefore a small amount of a hydrocarbon-soluble component. Accordingly, a film molded from this resultant polymer has low surface tackiness.

The polyolefin obtained by the process of the present invention is excellent in particle size distribution, particle diameter and bulk density, and the copolyolefin obtained has a narrow composition distribution.

In another preferred embodiment of the present invention, propylene and an alpha-olefin having 2 or from about 4 to about 20 carbon atoms are copolymerized in the presence of the catalyst system described above. The catalyst system may be one subjected to the preliminary polymerization described above.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics. Accordingly, according to this embodiment of producing the propylene copolymer, the resulting copolymer powder or the copolymer slurry becomes easy to handle.

The alpha-olefin having 2 carbon atoms is ethylene, and examples of the alpha-olefins having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene, or ethylene and 1-butene.

Block copolymerization of propylene and another alpha-olefin may be carried out in two stages. The polymerization in a first stage may be the homopolymerization of propylene or the copolymerization of propylene with the other alpha-olefin. Preferably, it is the copolymerization of propylene and ethylene, or propylene, ethylene and 1-butene. In one embodiment, the amount of the monomers polymerized in the first stage is from about 50 to about 95% by weight. In another embodiment, the amount of the monomers polymerized in the first stage is from about 60 to about 90% by weight. In the present invention, this first stage polymerization may, as required be carried out in two or more stages under the same or different polymerization conditions.

In one embodiment, the polymerization in a second stage is desirably carried out such that the mole ratio of propylene to the other alpha-olefin(s) is from about 10/90 to about 90/10. In another embodiment, the polymerization in a second stage is desirably carried out such that the mole ratio of propylene to the other alpha-olefin(s) is from about 20/80 to about 80/20. In yet another embodiment, the polymerization in a second stage is desirably carried out such that the mole ratio of propylene to the other alpha-olefin(s) is from about 30/70 to about 70/30. The step of producing a crystalline polymer or copolymer of another alpha-olefin may be provided in the second polymerization stage.

The propylene copolymer so obtained may be a random copolymer or the above-described block copolymer. This propylene copolymer typically contains from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, a propylene random copolymer contains from about 8 to about 18 mole % of units derived from the alpha-olefin having 2 or from about 4 to about 20 carbon atoms. In one embodiment, the propylene block copolymer contains from about 10 to about 50 mole % of units derived from the alpha-olefin having 2 or 4–20 carbon atoms. In another embodiment, the propylene block copolymer contains from about 20 to about 40 mole % of units derived from the alpha-olefin having 2 or 4–20 carbon atoms.

In another one embodiment, copolymers made with the catalyst system of the present invention contain from about 50% to about 99% by weight poly-alpha-olefins and from about 1% to about 50% by weight comonomers (such as thermoplastic or elastomeric monomers). In another embodiment, copolymers made with the catalyst system of the present invention contain from about 75% to about 98% by weight poly-alpha-olefins and from about 2% to about 25% by weight comonomers.

It should be understood that where there is no reference to the polyunsaturated compound that can be used, the method of polymerization, the amount of the catalyst system and the polymerization conditions, the same description as the above embodiments are applicable.

The catalysts/methods of the present invention lead to the production of poly-alpha-olefins having xylene solubles (XS) from about 2% to about 10%, depending upon the specific (cycloalkyl)methyl organosilicon compound mployed. In another embodiment, poly-alpha-olefins having xylene solubles (XS) from about 3% to about 6%, depending upon the specific (cycloalkyl)methyl organosilicon compound employed, are produced in accordance with the present invention. XS refers to the percent of solid polymer that dissolves into xylene. A low XS % value generally corresponds to a highly isotactic polymer (i.e., higher crystallinity), whereas a high XS % value generally corresponds to a low isotactic polymer.

For example, in one embodiment, when employing bis{(cyclobutyl)methyl}dimethoxysilane as the (cycloalkyl)methyl organosilicon compound in the catalyst system, a polypropylene polymer made therewith has an XS from about 2% to about 4%. In another embodiment, when employing bis{(cyclopropyl)methyl}dimethoxysilane as the (cycloalkyl)methyl organosilicon compound in the catalyst system, a polypropylene polymer made therewith has an XS from about 4% to about 6%.

In one embodiment, the catalyst efficiency (measured as kilogram of polymer produced per gram of catalyst) of the catalyst system of the present invention is at least about 25. In another embodiment, the catalyst efficiency of the catalyst system of the present invention is at least about 30. In yet another embodiment, the catalyst efficiency of the catalyst system of the present invention is at least about 32.

The catalysts/methods of the present invention lead to the production of poly-alpha-olefins having melt flow indexes (MFI) from about 5 to about 9, depending upon the specific (cycloalkyl)methyl organosilicon compound employed. For example, in one embodiment, when employing bis{(cyclobutyl)methyl}dimethoxysilane as the (cycloalkyl)methyl organosilicon compound in the catalyst system, a polypropylene polymer made therewith has an MFI from about 7 to about 8. In another embodiment, when employing bis{(cyclopropyl)methyl}dimethoxysilane as the (cycloalkyl)methyl organosilicon compound in the catalyst, a polypropylene polymer made therewith has an MFI from about 6 to about 7. In some instances a relatively high MFI indicates that a relatively high catalyst efficiency is obtainable. The MFI (flow rate) is measured according to ASTM standard D 1238.

The catalysts/methods of the present invention lead to the production of poly-alpha-olefins having a relatively narrow molecular weight distribution. In one embodiment, the Mw/Mn of a polypropylene polymer made with a catalyst system containing the (cycloalkyl)methyl organosilicon compound is from about 3 to about 5.5. In another embodiment, the Mw/Mn of a polypropylene polymer made with a catalyst system containing the (cycloalkyl)methyl organosilicon compound is from about 3.5 to about 5.

According to his invention, a polypropylene copolymer such as a polypropylene random copolymer having a low melting point can be obtained in a large amount and a high yield. In addition, the amount of the by-product hydrocarbon-soluble copolymer can be reduced. The polymerization can be carried out without any trouble even in suspension. Since the amount of the copolymer yielded per unit amount of titanium is large, an operation of removing the catalyst after the polymerization can be omitted.

The propylene random copolymer obtained by the present invention has excellent heat sealability, heat seal imparting property, transparency and antiblocking property and contains a small amount of a portion soluble in a hydrocarbon.

The present invention can produce a propylene block copolymer having one or more of excellent melt-flowability, moldability, rigidity, impact strength and impact strength with a high catalytic efficiency and good operability. Moreover, by selecting one of the (cycloalkyl)methyl organosilicon compounds, the isotactic index of the resulting poly-alpha-olefin can be set at a desirable level. Employing the (cycloalkyl)methyl organosilicon compounds of the present invention yields catalysts simultaneously having high catalytic efficiency and one or more of excellent melt-flowability, moldability, rigidity, impact strength and impact strength.

Another benefit attributable to the present invention is that a relatively large margin of error in the amount of organosilicon compound addition (to the catalyst system) can be tolerated with minimal changes in isotacticity and catalytic activity. In many instances, when using organosilicon compounds that do not contain a (cycloalkyl)methyl moiety, changes in the amount of organosilicon compound addition to a polyolefin catalyst noticeably effect changes in either or both catalytic activity and isotacticity of the result polymer.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

1. Preparation of a Solid Titanium Catalyst Component (A)

Anhydrous magnesium chloride (0.05 mol), toluene (75 ml), epoxy chloropropane (0.1 mol) and tributyl phosphate (0.03 mol) are introduced into a reactor which has thoroughly been purged with highly purified nitrogen. The temperature is raised to 50° C. with stirring, and the mixture is then maintained at this temperature for 2 hours, while the solids dissolve completely. Phthalic anhydride (0.008 mol) is added to the solution, and then the solution is maintained for an additional 1 hour at 50° C. The solution is cooled to −25° C. Titanium tetrachloride (55 ml) is added dropwise over the course of 1 hour. The solution is heated to 80° C. over the course of 3 hours, while a solid product precipitates. Diisobutyl Phthalate (0.0125 mol) is added and the mixture is maintained at the temperature of 80° C. for 1 hour.

The solid portion is collected by filtration and washed with toluene (2×100 ml). A brown-yellow solid precipitate is obtained. The solid is then treated with a mixture of toluene (60 ml) and titanium tetrachloride (40 ml) for 2 hours at 90° C. After the filtrate is removed, the treatment step as repeated. The solid is washed with dichloroethane (100 ml), and then with hexane (4×100 ml).

The solid catalyst component (A) obtained by the above procedure contains 1.92% by weight of titanium, 17.5% by weight of magnesium, 56.5% by weight of chlorine, 13.2% by weight of diisobutyl phthalate, 0.32% by weight of tributyl phosphate. The specific surface area of it is about 290 m$^2$/g.

2. Solution Polymerization

Industrial grade hexane (800 ml), triethyl aluminum (0.0025 mol) as component (B), bis{(cyclobutyl)methyl}dimethoxysilane (0.000125 mol) as component (C) and 0.5 mg, calculated as the titanium atom, of solid catalyst component (A) prepared as above are introduced into a 2-liter stainless steel autoclave which has been thoroughly purged with propylene. After introducing 0.41 l (standard volume) of hydrogen, the temperature is raised to 70° C. Propylene is introduced into the autoclave and a pressure of 7 kg/cm$^2$ is maintained. The temperature is maintained at 70° C. Propylene is polymerized for 2 hours. The amount of the resulting polymer is 435 g.

EXAMPLE 2

1. Preparation of a Solid Titanium Catalyst Component (A)

Anhydrous magnesium chloride (0.05 mol), toluene (75 ml), epoxy chloropropane (0.1 mol) and tributyl phosphate (0.03 mol) are introduced into a reactor which has thoroughly been purged with highly purified nitrogen. The temperature is raised to 50° C. with stirring, and the mixture is then maintained at this temperature for 2 hours, while the solids dissolve completely. Phthalic anhydride (0.008 mol) is added to the solution, and then the solution is maintained for an additional 1 hour at 50° C. The solution is cooled to −25° C. Titanium tetrachloride (55 ml) is added dropwise over the course of 1 hour. The solution is heated to 80° C. over the course of 3 hours, while a solid product precipitates. Diisobutyl Phthalate (0.0125 mol) is added and the mixture is maintained at the temperature of 80° C. for 1 hour.

The solid portion is collected by filtration and washed with toluene (2×100 ml). A brown-yellow solid precipitate is obtained. The solid is then treated with a mixture of toluene (60 ml) and titanium tetrachloride (40 ml) for 2 hours at 90° C. After the filtrate is removed, the treatment step as repeated. The solid is washed with dichloroethane (100 ml), and then with hexane (4×100 ml).

The solid catalyst component (A) obtained by the above procedure contains 1.92% by weight of titanium, 17.5% by weight of magnesium, 56.5% by weight of chlorine, 13.2% by weight of diisobutyl phthalate, 0.32% by weight of tributyl phosphate. The specific surface area of it is about 290 $m^2/g$.

2. Solution Polymerization

Industrial grade hexane (800 ml), triethyl aluminum (0.0025 mol) as component (B), bis{(cyclopropyl)methyl}dimethoxysilane (0.000125 mol) as component (C) and 0.5 mg, calculated as the titanium atom, of solid catalyst component (A) prepared as above are introduced into a 2-liter stainless steel autoclave which has been thoroughly purged with propylene. After introducing 0.41 l (standard volume) of hydrogen, the temperature is raised to 70° C. Propylene is introduced into the autoclave and a pressure of 7 $kg/cm^2$ is maintained. The temperature is maintained at 70° C. Propylene is polymerized for 2 hours. The amount of the resulting polymer is 435 g.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A catalyst system for use in olefinic polymerization, comprising:
   a solid titanium catalyst component;
   an organoaluminum compound having at least one aluminum-carbon bond; and
   an organosilicon compound comprising at least one (cycloalkyl)methyl group.

2. The catalyst system according to claim 1, wherein the solid titanium catalyst component is prepared by contacting a titanium compound and a magnesium compound in the presence of at least one of an internal electron donor, an organic epoxy compound, and an organic phosphorus compound.

3. The catalyst system according to claim 1, wherein the solid titanium catalyst component is prepared by contacting a titanium compound and a magnesium compound, and the titanium compound comprises at least one of titanium tetrahalides, alkoxytitanium trihalides, dialkoxytitanium dihalides, trialkoxytitanium monohalides, and tetraalkoxytitaniums.

4. The catalyst system according to claim 1, wherein the solid titanium catalyst component is prepared by contacting a titanium compound and a magnesium compound, and the magnesium compound comprises at least one of ethyl magnesium chloride, propyl magnesium chloride, butyl magnesium chloride, hexyl magnesium chloride, amyl magnesium chloride, butylethoxymagnesium, magnesium chloride, magnesium bromide, magnesium iodide, magnesium fluoride, methoxy magnesium chloride, ethoxy magnesium chloride, isopropoxy magnesium chloride, butoxy magnesium chloride, octoxy magnesium chloride, phenoxy magnesium chloride, methylphenoxy magnesium chloride, ethoxy magnesium, isopropoxy magnesium, butoxy magnesium, n-octoxy magnesium, 2-ethylhexoxy magnesium, phenoxy magnesium, dimethylphenoxy magnesium, magnesium laurate and magnesium stearate.

5. The catalyst system according to claim 1, wherein the organoaluminum compound comprises at least one of triethyl aluminum, tributyl aluminum, triisoprenyl aluminum, diethyl aluminum ethoxide, dibutyl aluminum butoxide, ethyl aluminum sesquiethoxide, butyl aluminum sesquibutoxide, diethyl aluminum chloride, dibutyl aluminum chloride, diethyl aluminum bromide, ethyl aluminum sesquichloride, butyl aluminum sesquichloride, ethyl aluminum sesquibromide, ethyl aluminum dichloride, propyl aluminum dichloride, butyl aluminum dibromide, diethyl aluminum hydride, dibutyl aluminum hydride, ethyl aluminum dihydride, propyl aluminum dihydride, ethyl aluminum ethoxychloride, butyl aluminum butoxychloride, ethyl aluminum ethoxybromide, $(C_2H_5)_2AlOAl(C_2H_5)_2$, $(C_4H_9)_2AlOAl(C_4H_9)_2$, methylaluminoxane, $LiAl(C_2H_5)_4$ and $LiAl(C_7H_{15})_4$.

6. The catalyst system according to claim 1, wherein the catalyst system comprises from about 0.001 to about 0.75 millimole of the solid titanium catalyst component, from about 1 to about 2,000 moles of the organoaluminum compound per mole of titanium atoms in the solid titanium catalyst component, and from about 0.001 to about 10 moles of the organosilicon compound.

7. The catalyst system according to claim 1, wherein the organosilicon compound comprises at least one selected from the group consisting of bis{(cyclobutyl)methyl}dimethoxysilane, bis{(cyclopropyl)methyl}dimethoxysilane, bis{(cyclopentyl)methyl}dimethoxysilane, bis{(cyclohexyl)methyl}dimethoxysilane, bis{(cycloheptyl)methyl}dimethoxysilane, (cyclobutyl)methyl (cyclopropyl)methyl dimethoxysilane, (cyclopentyl)methyl (cyclopropyl)methyl dimethoxysilane, (cyclohexyl)methyl (cyclopropyl)methyl dimethoxysilane, (cycloheptyl)methyl (cyclopropyl)methyl dimethoxysilane, (cyclobutyl)methyl (cyclopentyl)methyl dimethoxysilane, (cyclobutyl)methyl (cyclohexyl)methyl dimethoxysilane, (cyclobutyl)methyl (cycloheptyl)methyl dimethoxysilane, (cyclopentyl)methyl (cyclohexyl)methyl dimethoxysilane, (cyclopentyl)methyl (cycloheptyl)methyl dimethoxysilane, (cyclohexyl)methyl (cycloheptyl)methyl dimethoxysilane, (cyclobutyl)methyl cyclobutyl dimethoxysilane, (cyclobutyl)methyl methyl dimethoxysilane, (cyclopropyl)methyl methyl dimethoxysilane, (cyclopropyl)methyl isopropyl dimethoxysilane, (cyclopropyl)methyl butyl dimethoxysilane, (cyclopropyl)methyl cyclopentyl dimethoxysilane, (cyclopropyl)methyl cyclohexyl dimethoxysilane, (cyclopropyl)methyl 2-ethylhexyl dimethoxysilane, (cyclobutyl)methyl methyl dimethoxysilane, (cyclobutyl)methyl isopropyl dimethoxysilane, (cyclobutyl)methyl butyl dimethoxysilane, (cyclobutyl)methyl cyclopentyl dimethoxysilane, (cyclobutyl)methyl cyclohexyl dimethoxysilane, (cyclobutyl)methyl 2-ethylhexyl dimethoxysilane, (cyclopentyl)methyl cyclobutyl dimethoxysilane, (cyclopentyl)methyl methyl dimethoxysilane, (cyclohexyl)methyl methyl dimethoxysilane, (cyclohexyl)methyl isopropyl dimethoxysilane, (cyclohexyl)methyl butyl dimethoxysilane, (cyclohexyl)methyl cyclopentyl dimethoxysilane, (cyclohexyl)methyl cyclohexyl dimethoxysilane, (cyclohexyl)methyl 2-ethylhexyl dimethoxysilane, (cyclopentyl)methyl methyl dimethoxysilane, (cyclopentyl)methyl isopropyl dimethoxysilane, (cyclopentyl)methyl butyl dimethoxysilane, (cyclopentyl)methyl cyclopentyl dimethoxysilane, (cyclopentyl)methyl cyclohexyl dimethoxysilane, (cyclopentyl)methyl 2-ethylhexyl dimethoxysilane, (cycloheptyl)methyl cyclobutyl dimethoxysilane, (cycloheptyl)methyl methyl dimethoxysilane, (cycloheptyl)methyl methyl dimethoxysilane, (cycloheptyl)methyl isopropyl dimethoxysilane, (cycloheptyl)methyl butyl dimethoxysilane, (cycloheptyl)methyl cyclopentyl dimethoxysilane, (cycloheptyl)methyl cyclohexyl dimethoxysilane, (cycloheptyl)methyl 2-ethylhexyl dimethoxysilane, (cyclopropyl)methyl trimethoxysilane, (cyclobutyl)methyl trimethoxysilane, (cyclopentyl)methyl trimethoxysilane, (cyclohexyl)methyl trimethoxysilane, (cycloheptyl)methyl trimethoxysilane, bis{(cyclobutyl)methyl}diethoxysilane, bis{(cyclopropyl)methyl}diethoxysilane, bis{(cyclopentyl)methyl}diethoxysilane, bis{(cyclohexyl)methyl}diethoxysilane, bis{(cycloheptyl)methyl}diethoxysilane, (cyclobutyl)methyl (cyclopropyl)methyl diethoxysilane, (cyclopentyl)methyl (cyclopropyl)methyl diethoxysilane, (cyclohexyl)methyl (cyclopropyl)methyl diethoxysilane, (cycloheptyl)methyl (cyclopropyl)methyl diethoxysilane, (cyclobutyl)methyl (cyclopentyl)methyl diethoxysilane, (cyclobutyl)methyl (cyclohexyl)methyl diethoxysilane, (cyclobutyl)methyl (cycloheptyl)methyl diethoxysilane, (cyclopentyl)methyl (cyclohexyl)methyl diethoxysilane, (cyclopentyl)methyl (cycloheptyl)methyl diethoxysilane, (cyclohexyl)methyl (cycloheptyl)methyl diethoxysilane, (cyclobutyl)methyl cyclobutyl diethoxysilane, (cyclobutyl)methyl methyl diethoxysilane, (cyclopropyl)methyl methyl diethoxysilane, (cyclopropyl)methyl isopropyl diethoxysilane, (cyclopropyl)methyl butyl diethoxysilane, (cyclopropyl)methyl cyclopentyl diethoxysilane, (cyclopropyl)methyl cyclohexyl diethoxysilane, (cyclopropyl)methyl 2-ethylhexyl diethoxysilane, (cyclobutyl)methyl methyl diethoxysilane, (cyclobutyl)methyl isopropyl diethoxysilane, (cyclobutyl) methyl butyl diethoxysilane, (cyclobutyl)methyl cyclopentyl diethoxysilane, (cyclobutyl)methyl cyclohexyl diethoxysilane, (cyclobutyl)methyl 2-ethylhexyl diethoxysilane, (cyclopentyl)methyl cyclobutyl diethoxysilane, (cyclopentyl)methyl methyl diethoxysilane, (cyclohexyl)methyl methyl diethoxysilane, (cyclohexyl)methyl isopropyl diethoxysilane, (cyclohexyl)methyl butyl diethoxysilane, (cyclohexyl)methyl cyclopentyl diethoxysilane, (cyclohexyl)methyl cyclohexyl diethoxysilane, (cyclohexyl)methyl 2-ethylhexyl diethoxysilane, (cyclopentyl)methyl methyl diethoxysilane, (cyclopentyl)methyl isopropyl diethoxysilane, (cyclopentyl) methyl butyl diethoxysilane, (cyclopentyl)methyl cyclopentyl diethoxysilane, (cyclopentyl)methyl cyclohexyl diethoxysilane, (cyclopentyl)methyl 2-ethylhexyl diethoxysilane, (cycloheptyl)methyl cyclobutyl diethoxysilane, (cycloheptyl)methyl methyl diethoxysilane, (cycloheptyl)methyl methyl diethoxysilane, (cycloheptyl) methyl isopropyl diethoxysilane, (cycloheptyl)methyl butyl diethoxysilane, (cycloheptyl)methyl cyclopentyl diethoxysilane, (cycloheptyl)methyl cyclohexyl diethoxysilane, (cycloheptyl)methyl 2-ethylhexyl diethoxysilane, (cyclopropyl)methyl triethoxysilane, (cyclobutyl)methyl triethoxysilane, (cyclopentyl)methyl triethoxysilane, (cyclohexyl)methyl triethoxysilane, and (cycloheptyl)methyl triethoxysilane.

8. The catalyst system according to claim 1, wherein the organosilicon compound comprises at least one of bis{(cyclobutyl)methyl}dimethoxysilane, bis{(cyclopropyl)methyl}dimethoxysilane, bis{(cyclopentyl)methyl}dimethoxysilane, and bis{(cyclohexyl)methyl}dimethoxysilane.

9. A catalyst system for use in olefinic polymerization, comprising:
   a solid titanium catalyst component prepared by contacting a titanium compound and a magnesium compound, the solid titanium catalyst component comprising from about 0.01 to about 500 moles of the titanium compound per mole of the magnesium compound;
   an organoaluminum compound having at least one aluminum-carbon bond, wherein the catalyst system has a mole ratio of aluminum to titanium from about 5 to about 1,000; and
   an organosilicon compound comprising at least one (cycloalkyl)methyl group, wherein the catalyst system has a mole ratio of the organoaluminum compound to the organosilicon compound from about 2 to about 90.

10. The catalyst system according to claim 9, wherein the organosilicon compound comprises at least one selected from the group consisting of bis{(cyclobutyl)methyl}dimethoxysilane, bis{(cyclopropyl)methyl}dimethoxysilane, bis{(cyclopentyl)methyl}dimethoxysilane, bis{(cyclohexyl)methyl}dimethoxysilane, bis{(cycloheptyl)methyl}dimethoxysilane, (cyclobutyl)methyl (cyclopropyl)methyl dimethoxysilane, (cyclopentyl)methyl (cyclopropyl)methyl dimethoxysilane, (cyclohexyl)methyl (cyclopropyl)methyl dimethoxysilane, (cycloheptyl)methyl (cyclopropyl)methyl dimethoxysilane, (cyclobutyl)methyl (cyclopentyl)methyl dimethoxysilane, (cyclobutyl)methyl (cyclohexyl)methyl dimethoxysilane, (cyclobutyl)methyl (cycloheptyl)methyl dimethoxysilane, (cyclopentyl)methyl (cyclohexyl)methyl dimethoxysilane, (cyclopentyl)methyl (cycloheptyl)methyl dimethoxysilane, (cyclohexyl)methyl (cycloheptyl)methyl dimethoxysilane, (cyclobutyl)methyl cyclobutyl dimethoxysilane, (cyclobutyl)methyl methyl dimethoxysilane, (cyclopropyl)methyl methyl dimethoxysilane, (cyclopropyl)methyl isopropyl dimethoxysilane, (cyclopropyl)methyl butyl dimethoxysilane, (cyclopropyl)methyl cyclopentyl dimethoxysilane, (cyclopropyl)methyl cyclohexyl dimethoxysilane, (cyclopropyl)methyl 2-ethylhexyl dimethoxysilane, (cyclobutyl)methyl methyl dimethoxysilane, (cyclobutyl)methyl isopropyl dimethoxysilane, (cyclobutyl)methyl butyl dimethoxysilane, (cyclobutyl)methyl cyclopentyl dimethoxysilane, (cyclobutyl)methyl cyclohexyl dimethoxysilane, (cyclobutyl)methyl 2-ethylhexyl dimethoxysilane, (cyclopentyl)methyl cyclobutyl dimethoxysilane, (cyclopentyl)methyl methyl dimethoxysilane, (cyclohexyl)methyl methyl dimethoxysilane, (cyclohexyl)methyl isopropyl dimethoxysilane, (cyclohexyl)methyl butyl dimethoxysilane, (cyclohexyl)methyl cyclopentyl dimethoxysilane, (cyclohexyl)methyl cyclohexyl dimethoxysilane, (cyclohexyl)methyl 2-ethylhexyl dimethoxysilane, (cyclopentyl)methyl methyl dimethoxysilane, (cyclopentyl)methyl isopropyl dimethoxysilane, (cyclopentyl)methyl butyl dimethoxysilane, (cyclopentyl)methyl cyclopentyl dimethoxysilane, (cyclopentyl)methyl cyclohexyl dimethoxysilane, (cyclopentyl)methyl 2-ethylhexyl dimethoxysilane, (cycloheptyl)methyl cyclobutyl dimethoxysilane, (cycloheptyl)methyl methyl dimethoxysilane, (cycloheptyl)methyl methyl dimethoxysilane, (cycloheptyl)methyl isopropyl dimethoxysilane, (cycloheptyl)methyl butyl dimethoxysilane, (cycloheptyl)methyl cyclopentyl dimethoxysilane, (cycloheptyl)methyl cyclohexyl dimethoxysilane, (cycloheptyl)methyl 2-ethylhexyl dimethoxysilane, (cyclopropyl)methyl trimethoxysilane, (cyclobutyl)methyl trimethoxysilane, (cyclopentyl)methyl trimethoxysilane, (cyclohexyl)methyl trimethoxysilane, (cycloheptyl)methyl trimethoxysilane, bis{(cyclobutyl)methyl}diethoxysilane, bis{(cyclopropyl)methyl}diethoxysilane, bis{(cyclopentyl)methyl}diethoxysilane, bis{(cyclohexyl)methyl}diethoxysilane, bis{(cycloheptyl)methyl}diethoxysilane, (cyclobutyl)methyl (cyclopropyl)methyl diethoxysilane, (cyclopentyl)methyl (cyclopropyl)methyl diethoxysilane, (cyclohexyl)methyl (cyclopropyl)methyl diethoxysilane, (cycloheptyl)methyl (cyclopropyl)methyl diethoxysilane, (cyclobutyl)methyl (cyclopentyl)methyl diethoxysilane, (cyclobutyl)methyl (cyclohexyl)methyl diethoxysilane, (cyclobutyl)methyl (cycloheptyl)methyl diethoxysilane, (cyclopentyl)methyl (cyclohexyl)methyl diethoxysilane, (cyclopentyl)methyl (cycloheptyl)methyl diethoxysilane, (cyclohexyl)methyl (cycloheptyl)methyl diethoxysilane, (cyclobutyl)methyl cyclobutyl diethoxysilane, (cyclobutyl)methyl methyl diethoxysilane, (cyclopropyl)methyl methyl diethoxysilane, (cyclopropyl)methyl isopropyl diethoxysilane, (cyclopropyl)methyl butyl diethoxysilane, (cyclopropyl)methyl cyclopentyl diethoxysilane, (cyclopropyl)methyl cyclohexyl diethoxysilane, (cyclopropyl)methyl 2-ethylhexyl diethoxysilane, (cyclobutyl)methyl methyl diethoxysilane, (cyclobutyl)methyl isopropyl diethoxysilane, (cyclobutyl) methyl butyl diethoxysilane, (cyclobutyl)methyl cyclopentyl diethoxysilane, (cyclobutyl)methyl cyclohexyl diethoxysilane, (cyclobutyl)methyl 2-ethylhexyl diethoxysilane, (cyclopentyl)methyl cyclobutyl diethoxysilane, (cyclopentyl)methyl methyl diethoxysilane, (cyclohexyl)methyl methyl diethoxysilane, (cyclohexyl)methyl isopropyl diethoxysilane, (cyclohexyl)methyl butyl diethoxysilane, (cyclohexyl)methyl cyclopentyl diethoxysilane, (cyclohexyl)methyl cyclohexyl diethoxysilane, (cyclohexyl)methyl 2-ethylhexyl diethoxysilane, (cyclopentyl)methyl methyl diethoxysilane, (cyclopentyl)methyl isopropyl diethoxysilane, (cyclopentyl) methyl butyl diethoxysilane, (cyclopentyl)methyl cyclopentyl diethoxysilane, (cyclopentyl)methyl cyclohexyl diethoxysilane, (cyclopentyl)methyl 2-ethylhexyl diethoxysilane, (cycloheptyl)methyl cyclobutyl diethoxysilane, (cycloheptyl)methyl methyl diethoxysilane, (cycloheptyl)methyl methyl diethoxysilane, (cycloheptyl)methyl isopropyl diethoxysilane, (cycloheptyl)methyl butyl diethoxysilane, (cycloheptyl)methyl cyclopentyl diethoxysilane, (cycloheptyl)methyl cyclohexyl diethoxysilane, (cycloheptyl)methyl 2-ethylhexyl diethoxysilane, (cyclopropyl)methyl triethoxysilane, (cyclobutyl)methyl triethoxysilane, (cyclopentyl)methyl triethoxysilane, (cyclohexyl)methyl triethoxysilane, and (cycloheptyl)methyl triethoxysilane.

11. A method of making a catalyst for use in olefinic polymerization, comprising:
reacting a Grignard reagent having a (cycloalkyl)methyl group with an orthosilicate to provide an organosilicon compound having a (cycloalkyl)methyl moiety; and
combining the organosilicon compound with an organoaluminum compound having at least one aluminum-carbon bond and a solid titanium catalyst component to form the catalyst.

12. The method of claim 11 further comprising purifying the organosilicon compound by vacuum distillation.

13. The method of claim 11, wherein the orthosilicate is tetramethylorthosilicate or tetraethylorthosilicate.

14. The method of claim 11, wherein the Grignard reagent comprises a compound represented by Formula (XXIII)

$$MgXR^{13} \qquad (XXIII)$$

wherein X is a halogen atom, and $R^{13}$ is an organic group comprising one or more selected from the groups consisting of a (cyclopropyl)methyl, a (cyclobutyl)methyl group, a (cyclopentyl)methyl, a (cyclohexyl)methyl group, and a (cycloheptyl)methyl.

15. The method of claim 11, wherein the organosilicon compound comprises at least one selected from the group consisting of bis{(cyclobutyl)methyl}dimethoxysilane, bis{(cyclopropyl)methyl}dimethoxysilane, bis{(cyclopentyl)methyl}dimethoxysilane, bis{(cyclohexyl)methyl}dimethoxysilane, bis{(cycloheptyl)methyl}dimethoxysilane, (cyclobutyl)methyl (cyclopropyl)methyl dimethoxysilane, (cyclopentyl)methyl (cyclopropyl)methyl dimethoxysilane, (cyclohexyl)methyl (cyclopropyl)methyl dimethoxysilane, (cycloheptyl)methyl (cyclopropyl)methyl dimethoxysilane, (cyclobutyl)methyl (cyclopentyl)methyl dimethoxysilane, (cyclobutyl)methyl (cyclohexyl)methyl dimethoxysilane, (cyclobutyl)methyl (cycloheptyl)methyl dimethoxysilane, (cyclopentyl)methyl (cyclohexyl)methyl dimethoxysilane, (cyclopentyl)methyl (cycloheptyl)methyl dimethoxysilane, (cyclohexyl)methyl (cycloheptyl)methyl dimethoxysilane, (cyclobutyl)methyl cyclobutyl dimethoxysilane, (cyclobutyl)methyl methyl dimethoxysilane, (cyclopropyl)methyl methyl dimethoxysilane, (cyclopropyl)methyl isopropyl dimethoxysilane, (cyclopropyl)methyl butyl dimethoxysilane, (cyclopropyl)methyl cyclopentyl dimethoxysilane, (cyclopropyl)methyl cyclohexyl dimethoxysilane, (cyclopropyl)methyl 2-ethylhexyl dimethoxysilane, (cyclobutyl)methyl methyl dimethoxysilane, (cyclobutyl)methyl isopropyl dimethoxysilane, (cyclobutyl)methyl butyl dimethoxysilane, (cyclobutyl)methyl cyclopentyl dimethoxysilane, (cyclobutyl)methyl cyclohexyl dimethoxysilane, (cyclobutyl)methyl 2-ethylhexyl dimethoxysilane, (cyclopentyl)methyl cyclobutyl dimethoxysilane, (cyclopentyl)methyl methyl dimethoxysilane, (cyclohexyl)methyl methyl dimethoxysilane, (cyclohexyl)methyl isopropyl dimethoxysilane, (cyclohexyl)methyl butyl dimethoxysilane, (cyclohexyl)methyl cyclopentyl dimethoxysilane, (cyclohexyl)methyl cyclohexyl dimethoxysilane, (cyclohexyl)methyl 2-ethylhexyl dimethoxysilane, (cyclopentyl)methyl methyl dimethoxysilane, (cyclopentyl)methyl isopropyl dimethoxysilane, (cyclopentyl)methyl butyl dimethoxysilane, (cyclopentyl)methyl cyclopentyl dimethoxysilane, (cyclopentyl)methyl cyclohexyl dimethoxysilane, (cyclopentyl)methyl 2-ethylhexyl dimethoxysilane, (cycloheptyl)methyl cyclobutyl dimethoxysilane, (cycloheptyl)methyl methyl dimethoxysilane, (cycloheptyl)methyl methyl dimethoxysilane, (cycloheptyl)methyl isopropyl dimethoxysilane, (cycloheptyl)methyl butyl dimethoxysilane, (cycloheptyl)methyl cyclopentyl dimethoxysilane, (cycloheptyl)methyl cyclohexyl dimethoxysilane, (cycloheptyl)methyl 2-ethylhexyl dimethoxysilane, (cyclopropyl)methyl trimethoxysilane, (cyclobutyl)methyl trimethoxysilane, (cyclopentyl)methyl trimethoxysilane, (cyclohexyl)methyl trimethoxysilane, (cycloheptyl)methyl trimethoxysilane, bis{(cyclobutyl) methyl}diethoxysilane, bis{(cyclopropyl) methyl}diethoxysilane, bis{(cyclopentyl) methyl}diethoxysilane, bis{(cyclohexyl) methyl}diethoxysilane, bis{(cycloheptyl) methyl}diethoxysilane, (cyclobutyl)methyl (cyclopropyl) methyl diethoxysilane, (cyclopentyl)methyl (cyclopropyl) methyl diethoxysilane, (cyclohexyl)methyl (cyclopropyl) methyl diethoxysilane, (cycloheptyl)methyl (cyclopropyl) methyl diethoxysilane, (cyclobutyl)methyl (cyclopentyl) methyl diethoxysilane, (cyclobutyl)methyl (cyclohexyl) methyl diethoxysilane, (cyclobutyl)methyl (cycloheptyl) methyl diethoxysilane, (cyclopentyl)methyl (cyclohexyl) methyl diethoxysilane, (cyclopentyl)methyl (cycloheptyl) methyl diethoxysilane, (cyclohexyl)methyl (cycloheptyl) methyl diethoxysilane, (cyclobutyl)methyl cyclobutyl diethoxysilane, (cyclobutyl)methyl methyl diethoxysilane, (cyclopropyl)methyl methyl diethoxysilane, (cyclopropyl) methyl isopropyl diethoxysilane, (cyclopropyl)methyl butyl diethoxysilane, (cyclopropyl)methyl cyclopentyl diethoxysilane, (cyclopropyl)methyl cyclohexyl diethoxysilane, (cyclopropyl)methyl 2-ethylhexyl diethoxysilane, (cyclobutyl)methyl methyl diethoxysilane, (cyclobutyl)methyl isopropyl diethoxysilane, (cyclobutyl) methyl butyl diethoxysilane, (cyclobutyl)methyl cyclopentyl diethoxysilane, (cyclobutyl)methyl cyclohexyl diethoxysilane, (cyclobutyl)methyl 2-ethylhexyl diethoxysilane, (cyclopentyl)methyl cyclobutyl diethoxysilane, (cyclopentyl)methyl methyl diethoxysilane, (cyclohexyl)methyl methyl diethoxysilane, (cyclohexyl) methyl isopropyl diethoxysilane, (cyclohexyl)methyl butyl diethoxysilane, (cyclohexyl)methyl cyclopentyl diethoxysilane, (cyclohexyl)methyl cyclohexyl diethoxysilane, (cyclohexyl)methyl 2-ethylhexyl diethoxysilane, (cyclopentyl)methyl methyl diethoxysilane, (cyclopentyl)methyl isopropyl diethoxysilane, (cyclopentyl) methyl butyl diethoxysilane, (cyclopentyl)methyl cyclopentyl diethoxysilane, (cyclopentyl)methyl cyclohexyl diethoxysilane, (cyclopentyl)methyl 2-ethylhexyl diethoxysilane, (cycloheptyl)methyl cyclobutyl diethoxysilane, (cycloheptyl)methyl methyl diethoxysilane, (cycloheptyl)methyl methyl diethoxysilane, (cycloheptyl) methyl isopropyl diethoxysilane, (cycloheptyl)methyl butyl diethoxysilane, (cycloheptyl)methyl cyclopentyl diethoxysilane, (cycloheptyl)methyl cyclohexyl diethoxysilane, (cycloheptyl)methyl 2-ethylhexyl diethoxysilane, (cyclopropyl)methyl triethoxysilane, (cyclobutyl)methyl triethoxysilane, (cyclopentyl)methyl triethoxysilane, (cyclohexyl)methyl triethoxysilane, and (cycloheptyl)methyl triethoxysilane.

16. A polymerization process, comprising:
polymerizing or copolymerizing an alpha-olefin in the presence of a catalyst system comprising:
a solid titanium catalyst component;
an organoaluminum compound having at least one aluminum-carbon bond; and
an organosilicon compound comprising at least one (cycloalkyl)methyl group.

17. The polymerization process of claim 16, wherein during polymerization a temperature from about 20° C. to about 200° C. and a pressure from about atmospheric pressure to about 100 kg/cm$^2$ is maintained.

18. The polymerization process of claim 16, wherein the organosilicon compound comprises at least one selected from the group consisting of bis{(cyclobutyl) methyl}dimethoxysilane, bis{(cyclopropyl) methyl}dimethoxysilane, bis{(cyclopentyl) methyl}dimethoxysilane, bis{(cyclohexyl) methyl}dimethoxysilane, bis{(cycloheptyl) methyl}dimethoxysilane, (cyclobutyl)methyl (cyclopropyl) methyl dimethoxysilane, (cyclopentyl)methyl (cyclopropyl) methyl dimethoxysilane, (cyclohexyl)methyl (cyclopropyl) methyl dimethoxysilane, (cycloheptyl)methyl (cyclopropyl) methyl dimethoxysilane, (cyclobutyl)methyl (cyclopentyl) methyl dimethoxysilane, (cyclobutyl)methyl (cyclohexyl) methyl dimethoxysilane, (cyclobutyl)methyl (cycloheptyl) methyl dimethoxysilane, (cyclopentyl)methyl (cyclohexyl) methyl dimethoxysilane, (cyclopentyl)methyl (cycloheptyl) methyl dimethoxysilane, (cyclohexyl)methyl (cycloheptyl) methyl dimethoxysilane, (cyclobutyl)methyl cyclobutyl dimethoxysilane, (cyclobutyl)methyl methyl dimethoxysilane, (cyclopropyl)methyl methyl dimethoxysilane, (cyclopropyl)methyl isopropyl dimethoxysilane, (cyclopropyl)methyl butyl dimethoxysilane, (cyclopropyl)methyl cyclopentyl dimethoxysilane, (cyclopropyl)methyl cyclohexyl dimethoxysilane, (cyclopropyl)methyl 2-ethylhexyl dimethoxysilane, (cyclobutyl)methyl methyl dimethoxysilane, (cyclobutyl)methyl isopropyl dimethoxysilane, (cyclobutyl)methyl butyl dimethoxysilane, (cyclobutyl)methyl cyclopentyl dimethoxysilane, (cyclobutyl)methyl cyclohexyl dimethoxysilane, (cyclobutyl)methyl 2-ethylhexyl dimethoxysilane, (cyclopentyl)methyl cyclobutyl dimethoxysilane, (cyclopentyl)methyl methyl dimethoxysilane, (cyclohexyl)methyl methyl dimethoxysilane, (cyclohexyl)methyl isopropyl dimethoxysilane, (cyclohexyl)methyl butyl dimethoxysilane, (cyclohexyl)methyl cyclopentyl dimethoxysilane, (cyclohexyl)methyl cyclohexyl dimethoxysilane, (cyclohexyl)methyl 2-ethylhexyl dimethoxysilane, (cyclopentyl)methyl methyl dimethoxysilane, (cyclopentyl)methyl isopropyl dimethoxysilane, (cyclopentyl)methyl butyl dimethoxysilane, (cyclopentyl)methyl cyclopentyl dimethoxysilane, (cyclopentyl)methyl cyclohexyl dimethoxysilane, (cyclopentyl)methyl 2-ethylhexyl dimethoxysilane, (cycloheptyl)methyl cyclobutyl dimethoxysilane, (cycloheptyl)methyl methyl dimethoxysilane, (cycloheptyl)methyl methyl dimethoxysilane, (cycloheptyl)methyl isopropyl dimethoxysilane, (cycloheptyl)methyl butyl dimethoxysilane, (cycloheptyl)methyl cyclopentyl dimethoxysilane, (cycloheptyl)methyl cyclohexyl dimethoxysilane, (cycloheptyl)methyl 2-ethylhexyl dimethoxysilane, (cyclopropyl)methyl trimethoxysilane, (cyclobutyl)methyl trimethoxysilane, (cyclopentyl)methyl trimethoxysilane, (cyclohexyl)methyl trimethoxysilane, (cycloheptyl)methyl trimethoxysilane, bis{(cyclobutyl)methyl}diethoxysilane, bis{(cyclopropyl)methyl}diethoxysilane, bis{(cyclopentyl)methyl}diethoxysilane, bis{(cyclohexyl)methyl}diethoxysilane, bis{(cycloheptyl)methyl}diethoxysilane, (cyclobutyl)methyl (cyclopropyl)methyl diethoxysilane, (cyclopentyl)methyl (cyclopropyl)methyl diethoxysilane, (cyclohexyl)methyl (cyclopropyl)methyl diethoxysilane, (cycloheptyl)methyl (cyclopropyl)methyl diethoxysilane, (cyclobutyl)methyl (cyclopentyl)methyl diethoxysilane, (cyclobutyl)methyl (cyclohexyl)methyl diethoxysilane, (cyclobutyl)methyl (cycloheptyl)methyl diethoxysilane, (cyclopentyl)methyl (cyclohexyl)methyl diethoxysilane, (cyclopentyl)methyl (cycloheptyl)methyl diethoxysilane, (cyclohexyl)methyl (cycloheptyl)methyl diethoxysilane, (cyclobutyl)methyl cyclobutyl diethoxysilane, (cyclobutyl)methyl methyl diethoxysilane, (cyclopropyl)methyl methyl diethoxysilane, (cyclopropyl)methyl isopropyl diethoxysilane, (cyclopropyl)methyl butyl diethoxysilane, (cyclopropyl)methyl cyclopentyl diethoxysilane, (cyclopropyl)methyl cyclohexyl diethoxysilane, (cyclopropyl)methyl 2-ethylhexyl diethoxysilane, (cyclobutyl)methyl methyl diethoxysilane, (cyclobutyl)methyl isopropyl diethoxysilane, (cyclobutyl) methyl butyl diethoxysilane, (cyclobutyl)methyl cyclopentyl diethoxysilane, (cyclobutyl)methyl cyclohexyl diethoxysilane, (cyclobutyl)methyl 2-ethylhexyl diethoxysilane, (cyclopentyl)methyl cyclobutyl diethoxysilane, (cyclopentyl)methyl methyl diethoxysilane, (cyclohexyl)methyl methyl diethoxysilane, (cyclohexyl) methyl isopropyl diethoxysilane, (cyclohexyl)methyl butyl diethoxysilane, (cyclohexyl)methyl cyclopentyl diethoxysilane, (cyclohexyl)methyl cyclohexyl diethoxysilane, (cyclohexyl)methyl 2-ethylhexyl diethoxysilane, (cyclopentyl)methyl methyl diethoxysilane, (cyclopentyl)methyl isopropyl diethoxysilane, (cyclopentyl) methyl butyl diethoxysilane, (cyclopentyl)methyl cyclopentyl diethoxysilane, (cyclopentyl)methyl cyclohexyl diethoxysilane, (cyclopentyl)methyl 2-ethylhexyl diethoxysilane, (cycloheptyl)methyl cyclobutyl diethoxysilane, (cycloheptyl)methyl methyl diethoxysilane, (cycloheptyl)methyl methyl diethoxysilane, (cycloheptyl) methyl isopropyl diethoxysilane, (cycloheptyl)methyl butyl diethoxysilane, (cycloheptyl)methyl cyclopentyl diethoxysilane, (cycloheptyl)methyl cyclohexyl diethoxysilane, (cycloheptyl)methyl 2-ethylhexyl diethoxysilane, (cyclopropyl)methyl triethoxysilane, (cyclobutyl)methyl triethoxysilane, (cyclopentyl)methyl triethoxysilane, (cyclohexyl)methyl triethoxysilane, and (cycloheptyl)methyl triethoxysilane.

19. The polymerization process of claim 16, wherein the catalyst system has a catalyst efficiency of at least about 25 kg of polymer produced/g catalyst.

20. The polymerization process of claim 16, wherein the alpha-olefin comprises at least one of ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane.

21. The polymerization process of claim 16, wherein the alpha-olefin comprises at least two of ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane.

22. The polymerization process of claim 16, wherein at least one of styrene, butadiene, acrylonitrile, acrylamide, alpha-methyl styrene, chlorostyrene, vinyl toluene, divinyl benzene, diallylphthalate, alkyl methacrylates and alkyl acrylates is copolymerized with the alpha-olefin.

23. The polymerization process of claim 16, wherein the organosilicon compound comprises at least one of bis{(cyclobutyl)methyl}dimethoxysilane, bis{(cyclopropyl)methyl}dimethoxysilane, bis{(cyclopentyl)methyl}dimethoxysilane, and bis{(cyclohexyl)methyl}dimethoxysilane.

24. The polymerization process of claim 16 further comprising recovering a polymer comprising a polyolefin having xylene solubles from about 2% to about 10%.

25. The polymerization process of claim 16 further comprising recovering a polymer comprising a polyolefin having a melt flow index from about 5 to about 9.

* * * * *